United States Patent [19]

Iwata et al.

[11] Patent Number: 5,481,455

[45] Date of Patent: Jan. 2, 1996

[54] SYSTEM FOR DETECTING HYDROPLANING OF VEHICLE

[75] Inventors: Toru Iwata; Sota Yasuda, both of Kanagawa, Japan

[73] Assignee: Nissan Motor Co, Ltd., Yokohama, Japan

[21] Appl. No.: 960,647

[22] Filed: Oct. 14, 1992

[30] Foreign Application Priority Data

| Oct. 17, 1991 | [JP] | Japan | 3-269565 |
| Oct. 17, 1991 | [JP] | Japan | 3-269586 |
| Oct. 17, 1991 | [JP] | Japan | 3-269592 |
| Oct. 17, 1991 | [JP] | Japan | 3-269596 |
| Dec. 25, 1991 | [JP] | Japan | 3-342966 |
| Dec. 27, 1991 | [JP] | Japan | 3-346635 |

[51] Int. Cl.$^6$ .................................................. B60T 8/32
[52] U.S. Cl. ................ 364/424.01; 364/424.05; 364/426.02; 364/426.03; 180/197; 363/145
[58] Field of Search ................ 364/423.01, 424.05, 364/426.01, 426.02, 426.03; 180/197; 303/95, 100, 103, 109

[56] References Cited

U.S. PATENT DOCUMENTS

| 3,667,813 | 6/1972 | Burckhardt et al. . | |
| 4,637,487 | 1/1987 | Nakamura et al. | 180/197 |
| 4,760,893 | 8/1988 | Sigl et al. | 180/197 |
| 4,917,208 | 4/1990 | Komoda | 180/197 |
| 4,921,064 | 5/1990 | Wazaki et al. | 180/197 |
| 4,924,396 | 5/1990 | Fujioka et al. | 364/426.03 |
| 4,951,773 | 8/1990 | Poirier et al. | 180/197 |
| 4,982,806 | 1/1991 | Yoshizawa et al. | 180/197 |
| 4,991,910 | 2/1991 | Shimanuki et al. | 180/197 |
| 5,012,417 | 4/1991 | Watanabe et al. | 364/426.02 |
| 5,012,882 | 5/1991 | Oono et al. | 180/197 |
| 5,025,881 | 6/1991 | Poirier et al. | 180/197 |
| 5,038,883 | 8/1991 | Kushi et al. | 180/197 |
| 5,063,345 | 11/1991 | Akiyama | 324/173 |
| 5,099,942 | 3/1992 | Kushi et al. | 180/197 |
| 5,193,889 | 3/1993 | Schaefer et al. | 303/100 |
| 5,312,171 | 5/1994 | Schafer | 303/103 |
| 5,335,178 | 8/1994 | Schafer et al. | 364/426.02 |

FOREIGN PATENT DOCUMENTS

| 60-56662 | 4/1985 | Japan . |
| 62-99251 | 5/1987 | Japan . |
| 64-60463 | 3/1989 | Japan . |
| 3-270734 | 12/1991 | Japan . |
| 3-270731 | 12/1991 | Japan . |
| 3-270278 | 12/1991 | Japan . |

OTHER PUBLICATIONS

Wolfgang Maisch et al "ASR–Traction Control—A Logical Extension of ABS", 1987 Society of Automotive Engineers, Inc. 870337.

*Primary Examiner*—Kevin J. Teska
*Assistant Examiner*—Collin W. Park
*Attorney, Agent, or Firm*—Lowe, Price, LeBlanc & Becker

[57] ABSTRACT

A control system, such as a traction control system, for a wheel vehicle comprises a detecting section for detecting a hydroplaning condition by comparing a difference between a sensed undriven wheel speed, and a filter signal obtained by passing the sensed undriven wheel speed signal through a low-pass filter, and a controlling section for performing a control action adapted to the hydroplaning condition. This control system can detect the hydroplaning condition accurately, and control the vehicle adequately to negotiate the hydroplaning condition.

21 Claims, 17 Drawing Sheets

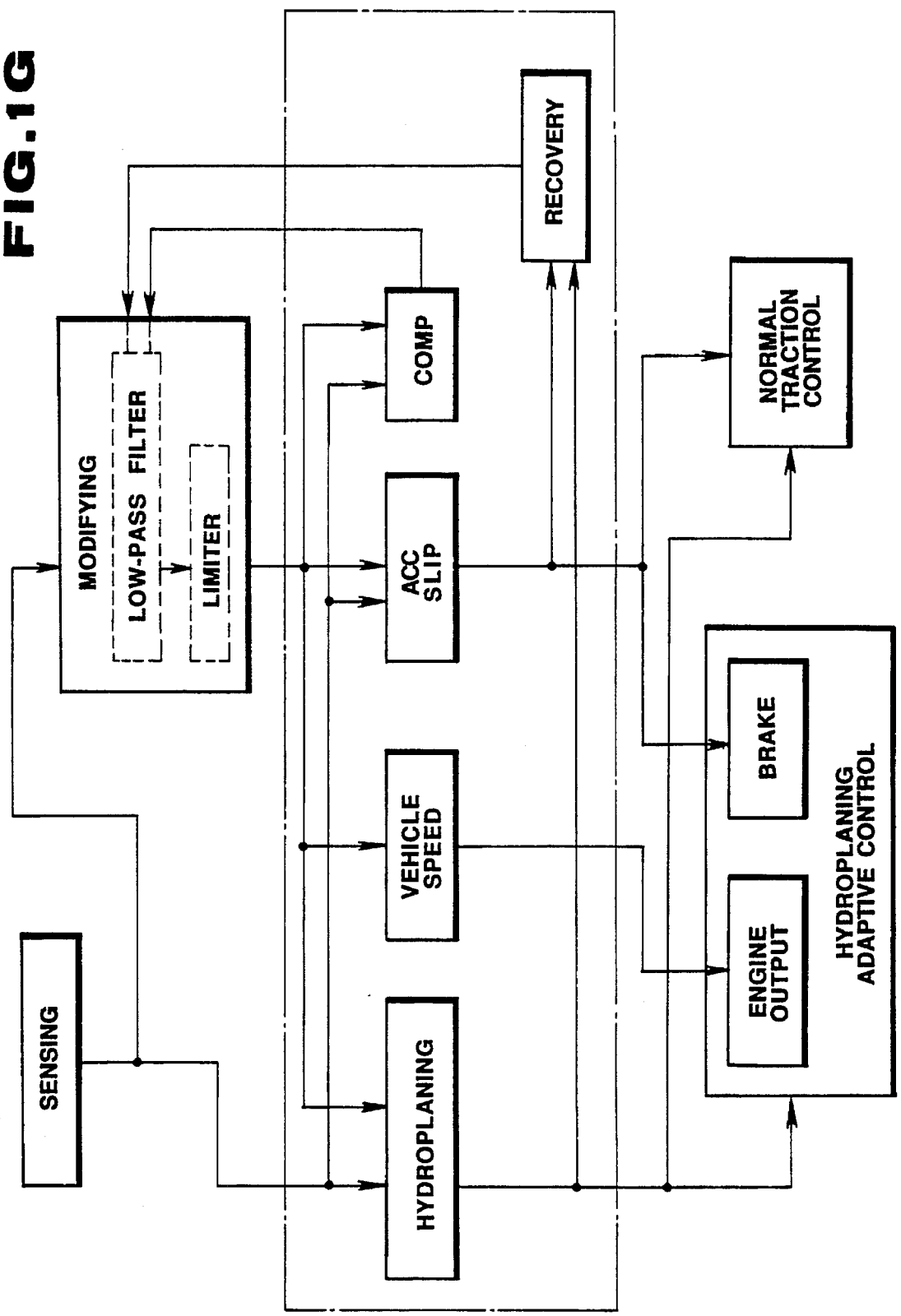

SYSTEM FOR DETECTING HYDROPLANING OF VEHICLE

BACKGROUND OF THE INVENTION

The present invention relates to a hydroplaning detecting system for detecting a hydroplaning condition of a wheeled vehicle, and a vehicle traction control system which can control a traction of a wheeled vehicle adequately even if a hydroplaning condition is present.

Japanese Patent Provisional Publication No. 64-60463 shows a hydroplaning detecting system which produces a signal indicative of presence of a hydroplaning condition when the vehicle speed is in a high speed range and a deceleration of an undriven wheel speed sensed by a wheel speed sensor is great. In the hydroplaning condition, the wheels behave as if there was a drive wheel slip and the traction control should be initiated. However, this is not a genuine drive slip but a pseudo drive slip. Therefore, this conventional system inhibits the brake control in the hydroplaning condition.

SUMMARY OF THE INVENTION

It is an object of the present invention to provide a system for detecting a hydroplaning condition of a wheeled vehicle more accurately.

It is another object of the present invention to provide a system for controlling a traction of a wheeled vehicle in a control mode adapted to the hydroplaning condition.

According to a first aspect of the present invention, a hydroplaning detecting system comprises an undriven wheel speed sensor for sensing rotation of an undriven wheel and producing an undriven wheel speed signal representing a sensed undriven wheel speed; a filtering means for generating a signal representing a filtered undriven wheel speed by subjecting said undriven wheel speed signal to an action of a low-pass filter with a predetermined cutoff frequency; and a detecting means for determining a difference between said filtered undriven wheel speed and said sensed undriven wheel speed, and generating a detection signal indicative of occurrence of a hydroplaning condition when said difference is equal to or greater than a predetermined (threshold) value.

According to another aspect of the present invention, a vehicle traction control system comprises a hydroplaning detecting means, and a hydroplaning adaptive controlling means which controls an engine output independently of a drive wheel acceleration slip when the hydroplaning condition is detected, and/or which controls a drive wheel brake pressure in a hydroplaning adaptive control mode when the hydroplaning condition is detected. In the hydroplaning adaptive control mode, the brake pressure is controlled with a reduced control gain, and/or the brake pressures for left and right drive wheels are controlled so that both pressures remain equal to each other.

BRIEF DESCRIPTION OF THE DRAWINGS

FIGS. 1A–1G are block diagrams schematically showing various aspects of the present invention.

DETAILED DESCRIPTION OF THE INVENTION

Figure 2:
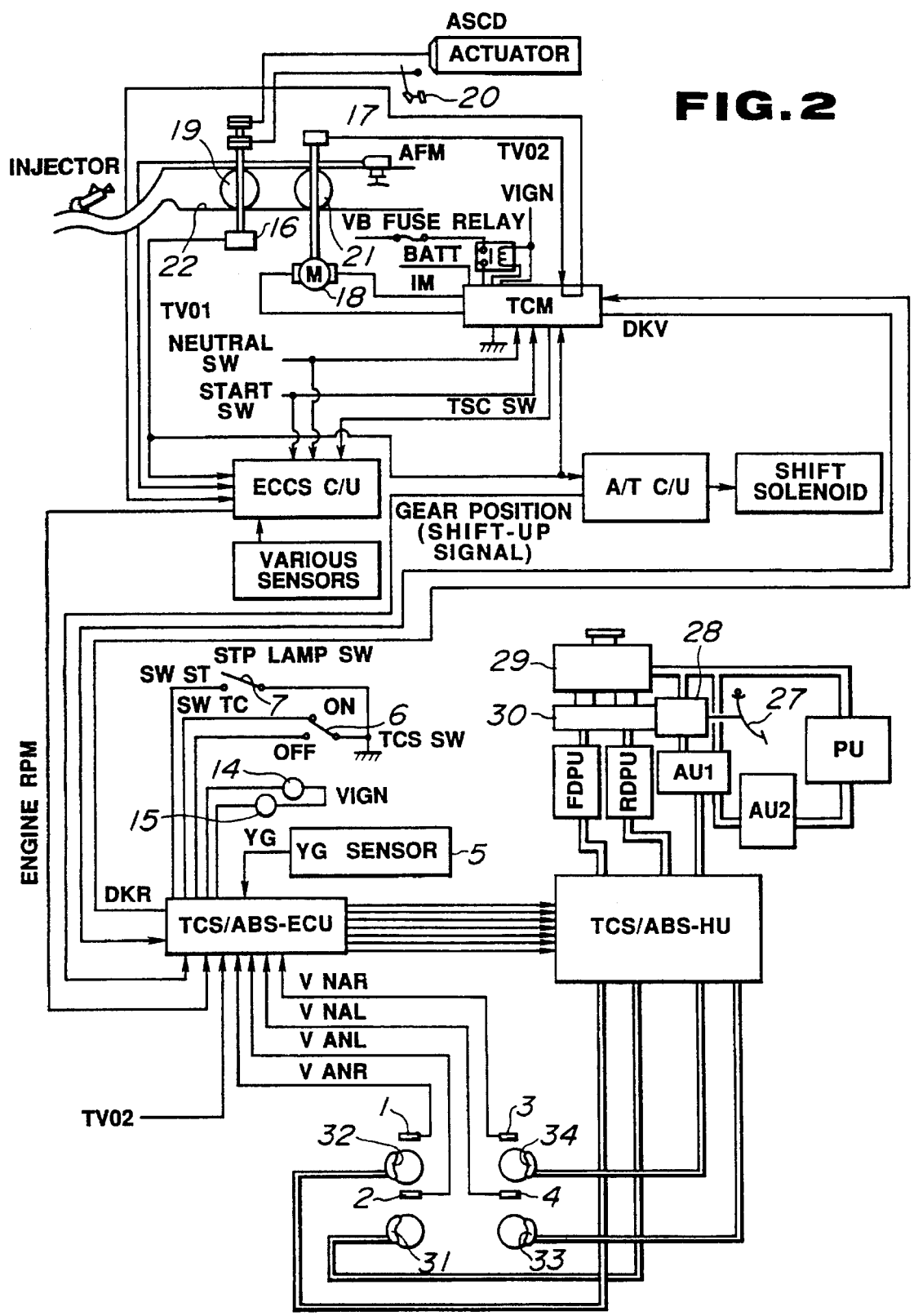
FIG. 2 is a view showing a vehicle control system according to one embodiment of the present invention.

FIG. 2 shows a vehicle control system according to a first embodiment of the present invention. The vehicle of this embodiment is a rear wheel drive vehicle, and includes right and left rear wheels which are driven wheels driven by an engine of the vehicle through a drive line, and right and left front wheels which are undriven wheels not drivingly connected with the engine of the vehicle. The control system of this embodiment includes both a traction control system (subsystem) for controlling the degree of rear wheel slip within an optimum range during acceleration slip by manipulating a throttle opening of the engine and by manipulating brake actuation forces of the right and left rear wheels individually and independently, and an antiskid brake control system (subsystem) for preventing wheel lock during deceleration slip by manipulating the brake pressure of each of the front and rear wheels.

The control system shown in FIG. 2 includes an electronic control unit TCS/ABS-ECU for the traction control and the anti-skid brake control. In the control system of this example, the electronic control unit TCS/ABS-ECU is a main control unit which combines functions of controllers of the traction control system (TCS) and the anti-skid brake control system (ABS). The traction and anti-skid control unit TCS/ABS-ECU receives input signals from various sensors, switches and other components. A front right wheel speed sensor 1 senses a wheel speed of the front right wheel, and sends a signal representing a sensed front right wheel speed $VW_{FR}$ to the main control unit TCS/ABS-ECU. A front left wheel speed sensor 2 senses a wheel speed of the front left wheel, and sends a signal representing a sensed front left wheel speed $VW_{FL}$ to the control unit ECU. In this example, the front wheel sensors 1 and 2 are sensors for sensing the speeds of the undriven wheels. Similarly, right and left rear wheel speed sensors 3 and 4 send, to the control unit TCS/ABS-ECU, wheel speed signals representing sensed right and left rear wheel speeds $VW_{RR}$ and $VW_{RL}$, respectively. A lateral acceleration sensor 5 senses a lateral acceleration of the vehicle, and sends a signal YG representing a sensed lateral acceleration Yg, to the main control unit TCS/ABS-ECU.

The main control unit TSC/ABS-ECU further receives a switch signal SWTC from a TCS switch 6, a switch signal SWST from a brake lamp switch (or stop lamp switch) 7, a first throttle opening signal representing an actual first throttle opening DKV from a throttle control module TCM, a gear position signal and a shift-up signal from an automatic transmission control unit A/T C/U, an engine rotational speed signal from an electronic concentrated engine control unit ECCS C/U, and a second throttle signal TVO2 from a second throttle sensor 17.

The traction and anti-skid main control unit TCS/ABS-ECU detects an acceleration slip, and delivers a signal representing a desired second throttle opening degree DKR, to the throttle control module TCM, as a throttle control signal, and solenoid signals to solenoid valves in a composite hydraulic unit TCS/ABS-HU, as brake control signals. In this way, the main control unit TCS/ABS-ECU performs the traction control by manipulating the throttle system and the brake system. Furthermore, the main control unit TCS/ABS-ECU detects a deceleration slip, and delivers the solenoid signals to the solenoid valves of the composite hydraulic unit TCS/ABS-HU to perform the anti-skid brake control.

The main control unit TCS/ABS-ECU further delivers a command signal to a failure indicating lamp 14, and a command signal to a TCS operation lamp 15. The control unit TCS/ABS-ECU turns on the failure indicating lamp 14 when the traction control system fails, and turns on the TCS lamp 15 when the traction control system is in operation.

The throttle control module TCM is a control circuit including, as a main section, a throttle motor driving circuit. The throttle control module TCM receives a first throttle signal TVO1 from a first throttle sensor 16, and delivers it, as an actual first throttle opening DKV, to the main control unit TCS/ABS-ECU. The throttle control module TCM further receives the second throttle signal TVO2 of the second throttle sensor 17, as a feedback information item with respect to the desired second throttle opening DKR, and applies a motor driving current IM to a throttle motor 18 in accordance with the desired second throttle opening DKR of the main control unit TCS/ABS-ECU.

The first and second throttle sensors 16 and 17 sense positions of first and second throttle valves 19 and 21, respectively. The first throttle valve 19 is connected with an accelerator pedal 20 so that the driver can operate the first throttle valve 19 with the accelerator pedal 20. The second throttle valve 21 is connected with the throttle motor 18 so that it is possible to open and close the second throttle valve 21 by controlling the throttle motor 18. The first and second throttle valves 19 and 21 are arranged in series in an engine intake passage 22.

The control system shown in FIG. 2 includes an electronic concentrated engine control system (ECCS) composed of the above-mentioned engine control unit ECCS C/U, an air flow meter AFM and various other components. In this example, an engine system of the vehicle includes at least one injector. The engine control system is designed to control the fuel injection, the ignition timing, the idle speed and other engine operating parameters. The engine control system receives the traction switch signal TCS SW, and adjusts a transient characteristic in response to the traction switch signal in an on state indicating that the traction control is in operation. For example, the engine control system performs a select-low control by selecting a smaller valve opening between the first throttle signal TVO1 and the second throttle signal TVO2, and interrupts a canister control and an EGR control when the traction switch signal is in the on state.

The automatic transmission control unit A/T C/U and a shift solenoid constitute an automatic transmission control system for performing a shift control and a lock-up control. The automatic transmission control unit A/T C/U supplies a gear position signal and a shift up signal to the main control unit TCS/ABS-ECU.

The control system of FIG. 2 further includes an auto speed control system including an ASCD actuator for automatically maintaining a preset vehicle speed. In order to prevent control interference, the control system interrupts an opening control of the first throttle valve 19 when the traction switch signal TCS SW in the on state is inputted, and makes gradual a returning speed of the first throttle valve 19 when the traction control switch signal TCS SW in the off state is inputted.

Figure 3:
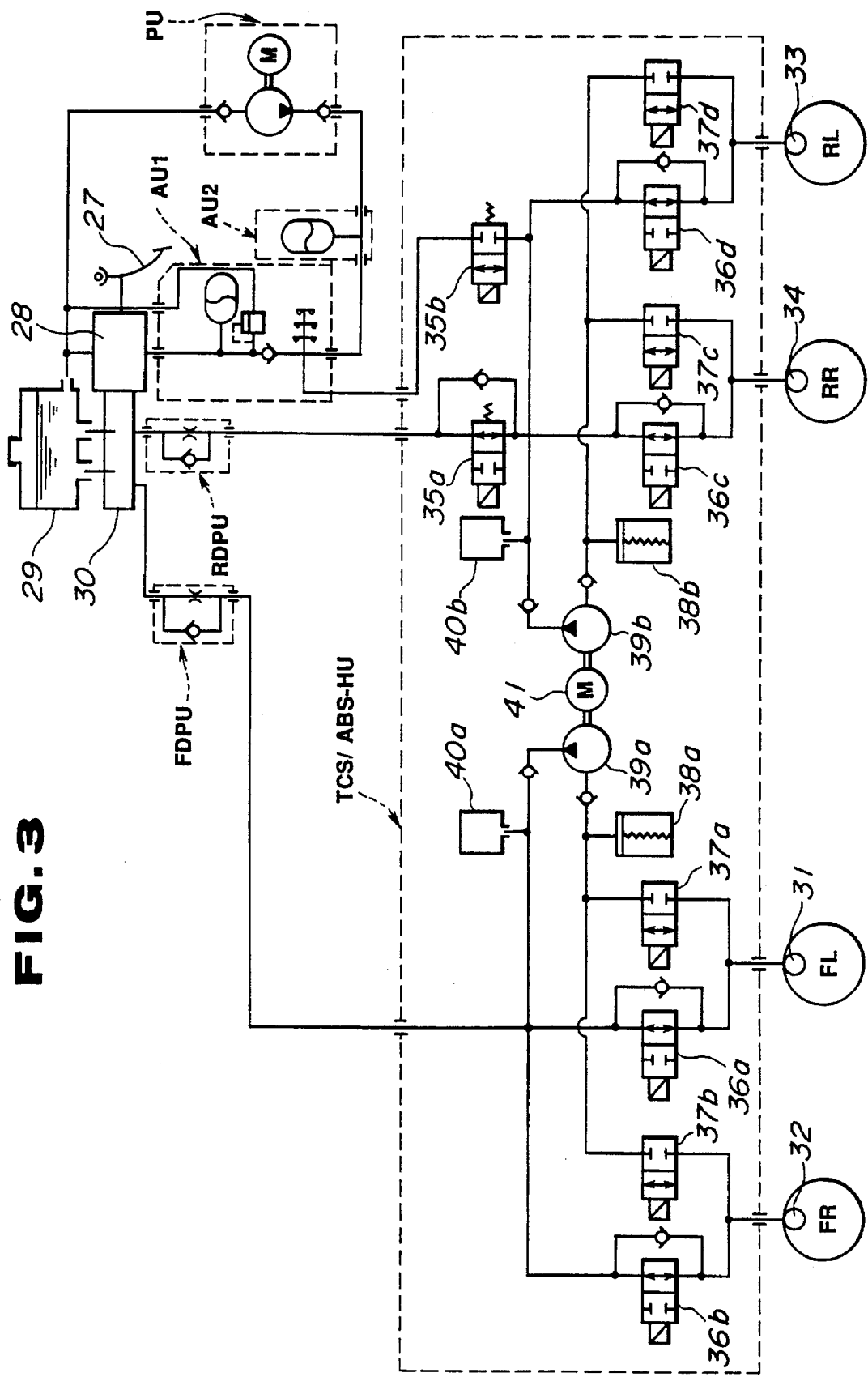
FIG. 3 is a hydraulic circuit diagram showing a brake system used in the system of FIG. 2.

FIG. 3 shows a hydraulic brake system of this embodiment, used for both the traction brake control and the anti-skid brake control.

As shown in FIG. 3, this brake system includes a brake pedal 27, an oil pressure booster 28, a reservoir 29, a brake master cylinder 30, four wheel cylinders 31–34, the above-mentioned composite hydraulic unit TCS/ABS-HU, a pump unit PU, first and second accumulator units AU1 and AU2, a front side damping unit FDPU and a rear side damping unit RDPU.

The composite hydraulic unit TCS/ABS-HU includes first and second cutoff valves 35a and 35b, a front left pressure increasing valve 36a, a front right pressure increasing valve 36b, a rear right pressure increasing valve 36c, a rear left pressure increasing valve 36d, a front left pressure reducing valve 37a, a front right pressure reducing valve 37b, a rear right pressure reducing valve 37c, a rear left pressure reducing valve 37d, a front side reservoir 38a, a rear side reservoir 38b, a front side pump 39a, a rear side pump 39b, a front side damper chamber 40a, a rear side damper chamber 40b, and a pump motor 41.

During the normal braking operation and during the antiskid brake control, the first and second cutoff valves 35a and 35b are held in their respective off states shown in FIG. 3 to admit the fluid pressure of the master cylinder 30. During the traction brake control (to control the traction by manipulating the brake pressures), the first and second cutoff valves 35a and 35b are switched to their respective on positions to admit the fluid pressure from the second accumulator unit AU2. In a pressure increasing mode of the traction control, the pressure control valves 36c, 36d, 37c and 37d are put in their respective off positions as shown in FIG. 3. In a pressure holding mode, only the pressure increasing valves 36c and 36d are put in their on positions. In a pressure reducing mode, the pressure control valves 36c, 36d, 37c and 37d are all put in the on positions, and the brake fluid from the wheel cylinders 33 and 34 are stored in the rear side reservoir 38b, and returned to the rear side damper chamber 40b by rotation of the rear side pump 39b.

The first accumulator unit AU1 serves as a pressure source for the brake booster 28, and the second accumulator unit AU2 serves as a pressure source for the traction brake control. The common pump unit PU sucks the brake fluid from the reservoir 29 and maintains a predetermined accumulator pressure of each of the first and second accumulator units AU1 and AU2.

The front and rear damping units FDPU and RDPU are designed to protect the master cylinder 30 from being influenced by fluid pressure variations in the hydraulic unit TCS/ABS-HU, in order to improve the pedal feeling.

The control system of this embodiment is operated as follows:

(A) Normal Traction Control

Figure 4:
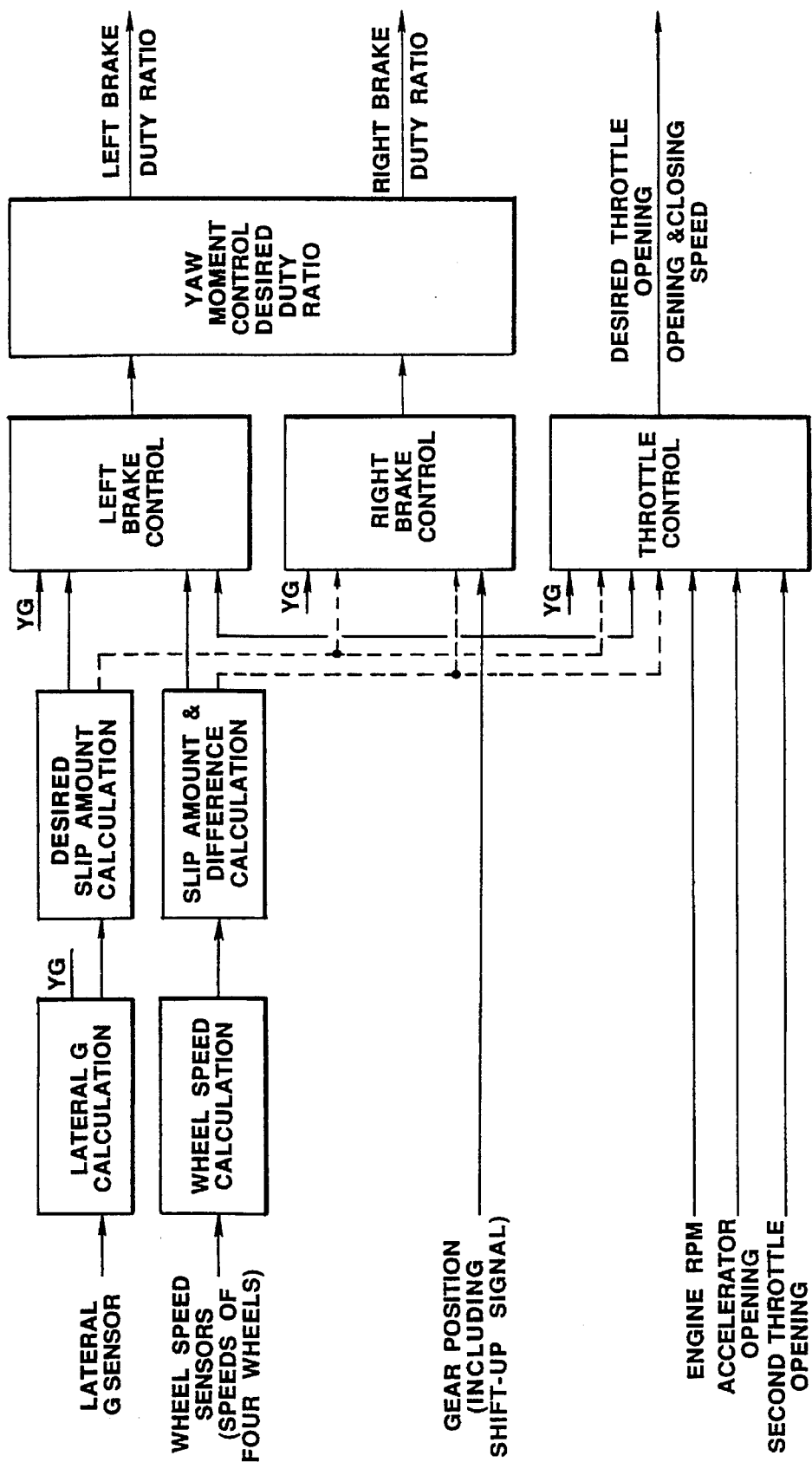
FIG. 4 is a block diagram schematically showing a traction control according to this embodiment of the invention.

FIG. 4 schematically shows the traction control performed in the control unit TCS/ABS-ECU. The traction control logic comprises the following four main sections. (i) Computation of an actual slip condition; The main control unit performs a filtering operation on the signals of the wheel speed sensors 1, 2, 3 and 4, and by so doing, obtains filtered wheel speeds. Then, the main control unit calculates an actual slip condition (such as a slip amount and a slip difference) in accordance with the filtered wheel speeds. (ii) Computation of a desired slip condition; The main control unit performs a filtering operation on the signal of the lateral acceleration sensor 5. The control unit determines in accordance with the lateral acceleration whether the vehicle is in a cornering operation or in a straight ahead operation, and calculates a desired slip condition suitable to the vehicle running condition in accordance with the lateral acceleration and the vehicle speed. (iii) Brake control; The control unit compares the actual slip condition with the desired slip condition, and calculates required brake pressure increasing and decreasing speeds (in the form of control duty ratios, for example). Then, the control unit delivers controls signals to the hydraulic unit TCS/ABS-HU. (iv) Throttle control; In accordance with the result of comparison between the actual slip condition and the desired slip condition, the main control unit calculates a required throttle opening degree and a throttle opening or closing speed, and sends output signals to the throttle control module TCM.

This control logic is designed to determine an allowable slip condition and shares of the throttle control and brake control in accordance with the lateral acceleration in order to improve the active safety of the vehicle by ensuring the ability of detecting critical conditions (steering force, squeal etc.) based on the base chassis performance in every road surface condition from a low friction (μ) surface to a high friction surface, Furthermore, the throttle and brake are controlled in accordance with the gear position in order to ensure the stability during shift, and to improve the controllability in each gear position. This control system further controls the throttle in accordance with the engine rpm in order to achieve a smooth acceleration feeling and controllability free from slip hunting, and to achieve an engine torque control providing a superior response characteristic.

(B) Detection of Hydroplaning Condition

Figure 5:
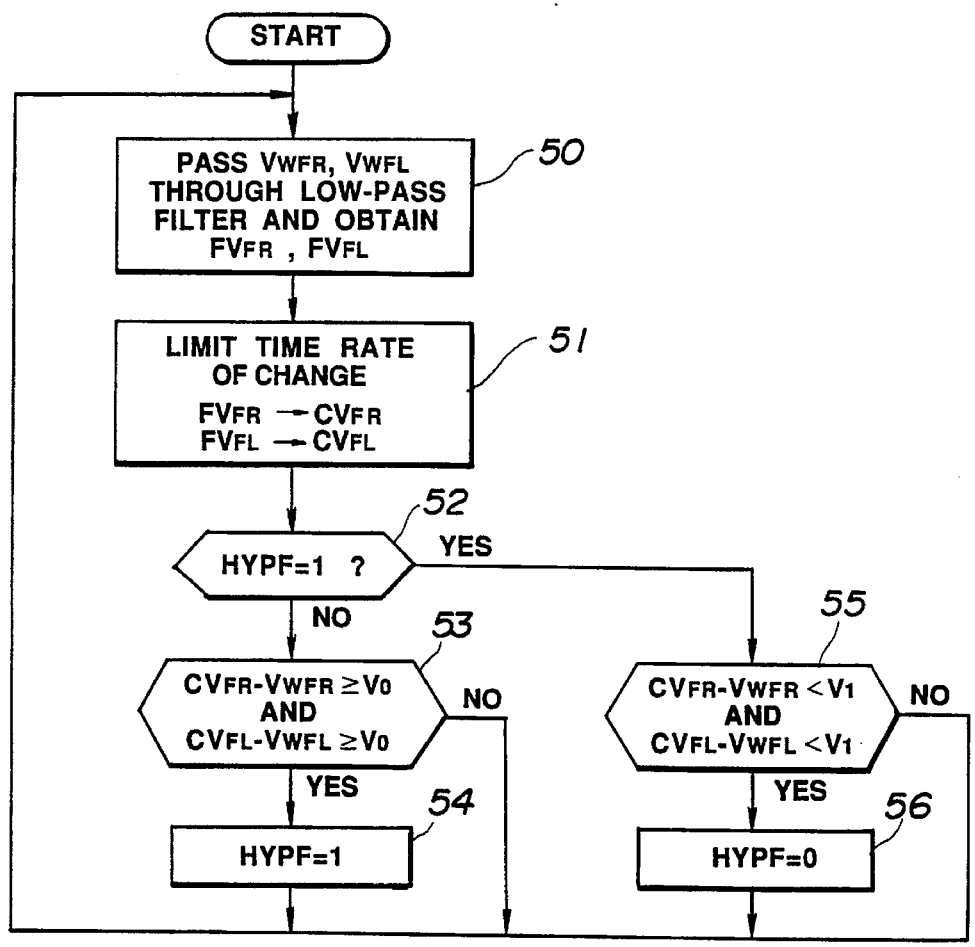
FIG. 5 is a flow chart showing a hydroplaning condition detecting section of a control procedure which is performed by a main control unit of the control system shown in FIG. 2, for detecting a hydroplaning condition.

FIG. 5 shows a sequence of steps for detecting a hydroplaning condition.

At a step 50, the main control unit TCS/ABS-ECU determines a filtered front right wheel speed $FV_{FR}$ and a filtered front left wheel speed $FV_{FL}$ by subjecting the sensed front right wheel speed $V_{WFR}$ and the sensed front left wheel speed $V_{WFL}$ to the action of a low-pass filter having a predetermined cutoff frequency. The step 50 corresponds to a filtering means of the present invention.

At a step 51, the control unit TCS/ABS-ECU determines a control filtered front right wheel speed $CV_{FR}$ and a control filtered front left wheel speed $CV_{FL}$ by limiting variations of the filtered front wheel speeds $FV_{FR}$ and $FV_{FL}$ in the following manner. The step 51 also corresponds to the filtering means.

Figure 6:
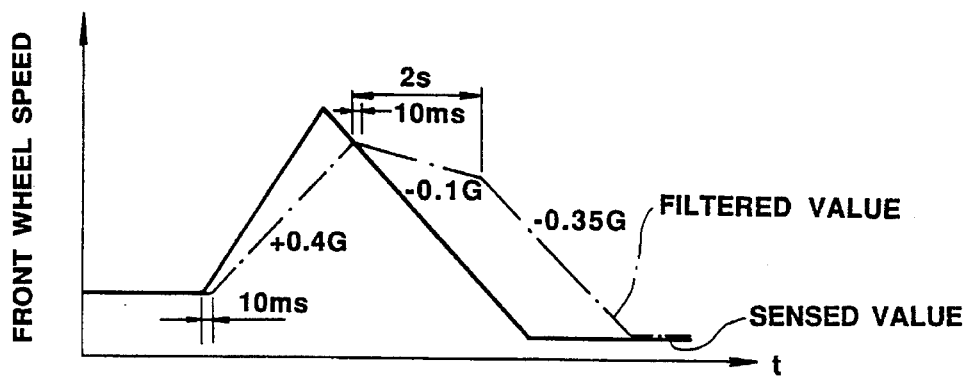
FIG. 6 is a graph showing characteristics of a sensed front wheel speed and a control filtered front wheel speed appearing in the control system of FIG. 2.

When an acceleration slip occurs, and the filtered front right wheel speed $FV_{FR}$ or the filtered front left wheel speed $FV_{FL}$ is smaller than the greater of the right and left rear wheel speeds $VW_{RR}$ and $VW_{RL}$, then the main control unit prevents the slope from exceeding +0.4G as shown in FIG. 6 on the accelerating side after an initial time interval of 10 msec (a processing cycle of 10 msec) in which the filtered speed is held constant. On the decelerating side, within a first interval of 2 sec, the main control unit holds the filtered speed constant for an initial interval of 10 msec, and then limits the deceleration under −0.1G. Thereafter, the slope is prevented from exceeding −0.35G. In this way, the upward and downward slopes are prevented from becoming excessively steep.

Figure 7:
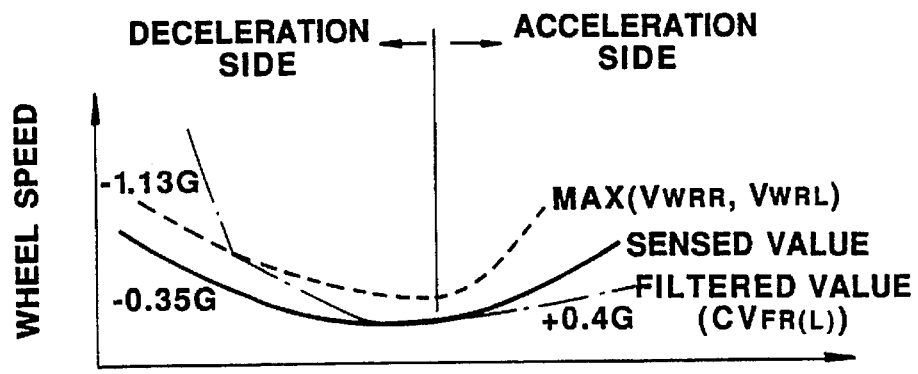
FIG. 7 is a graph showing characteristics of the drive wheel speed, sensed front wheel speed and control filtered front wheel speed in a transition from deceleration to acceleration.

When a deceleration slip occurs, and the filtered front right wheel speed $FV_{FR}$ or the filtered front left wheel speed $FV_{FL}$ is equal to or greater than the greater of the right and left rear wheel speeds $VW_{RR}$ and $VW_{RL}$, then the main control unit prevents the slope on the decelerating side from exceeding −1.13G, as shown in FIG. 7.

At a step 52, the main control unit determines whether a hydroplaning flag HYPF is equal to one or not. The hydroplaning flag HYPF is a condition code indicating presence and absence of a hydroplaning condition.

If HYPF=0, then the main control unit proceeds to a step 53, and determines, there, whether a difference between the control filtered front right wheel speed $CV_{FR}$ and the sensed front right wheel speed $V_{WFR}$ is equal to or greater than a predetermined difference value $V_0$ (5 km/h, for example), and at the same time a difference between the control filtered front left wheel speed $CV_{FL}$ and the sensed front left wheel speed $V_{WFL}$ is equal to or greater than the predetermined difference value $V_0$.

If $CV_{FR}-V_{WFR} \geq V_0$, and $CV_{FL}-V_{WFL} \geq V_0$, then the main control unit proceeds from the step 53 to a step 54, and sets the hydroplaning flag HYPF to one to indicate the existence of the hydroplaning condition.

If the answer of the step 52 is YES (that is, HYPF=1), the main control unit proceeds to a step 55, and determines whether the difference between the control filtered front right wheel speed $CV_{FR}$ and the sensed front right wheel speed $V_{WFR}$ is smaller than a predetermined value $V_1$ (2 km/h, for example), and at the same time the difference between the control filtered front left wheel speed $CV_{FL}$ and the sensed front left wheel speed $V_{WFL}$ is smaller than $V_1$.

If $CV_{FR}-V_{WFR} < V_1$, and $CV_{FL}-V_{WFL} < V_1$, then the main control unit proceeds to a step 56, and clears the hydroplaning flag HYPF to zero (HYPF=0) to indicate that the vehicle has escaped from the hydroplaning condition.

When the vehicle has plunged into a hydroplaning condition, the flow of control follows the sequence of the steps $50 \to 51 \to 52 \to 53 \to 54$, and the hydroplaning flag HYPF is set to one (HYPF=1). When the vehicle has escaped from the hydroplaning condition, the main control unit takes the route of the steps $50 \to 51 \to 52 \to 55 \to 56$, and clears the hydroplaning flag HYPF to zero.

Figure 8:
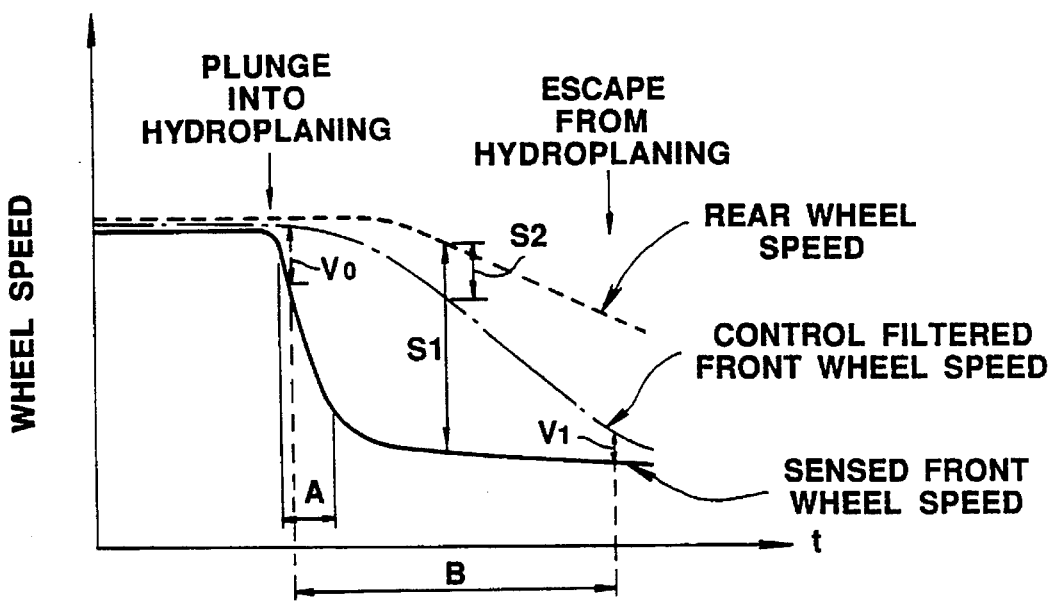
FIG. 8 is a graph showing characteristic of the wheel speeds in a hydroplaning condition.

As shown by a solid line in FIG. 8, the sensed wheel speed of at least one of the right and left front undriven wheels decreases steeply because of a resistance of a water film immediately after the vehicle has plunged into a hydroplaning condition. Then, the rate of decrease of the sensed front wheel speed becomes gradual as shown by the solid line in FIG. 8. On the other hand, the control filtered front wheel speed decreases more gradually, as shown by a one dot chain line in FIG. 8, from the effects of the low pass filtering, and the restriction of the amount of change of the filtered speed.

Therefore, the system of this embodiment of the invention can detects a hydroplaning condition very accurately. A conventional hydroplaning detecting system monitors only the rate of change of the sensed speed of at least one undriven wheel. Therefore, the conventional system can detect the hydroplaning condition only during an interval A shown in FIG. 8 during which the decelerating slope is steep. By contrast, the detecting system of this embodiment can accurately detect the hydroplaning condition all during an interval B which is substantial equal to the whole duration from the plunge into the hydroplaning condition to the escape from the hydroplaning condition, by monitoring the difference between the control filtered front wheel speed and the sensed front wheel speed of at least one of the undriven front wheels.

Even if the sensed front wheel speed is decreased abruptly and instantaneously by a disturbance of a road surface irregularity, this system does not misjudge it as a hydroplaning condition as long as the difference of the sensed wheel speed from the control filtered wheel speed obtained by cutting off a high frequency component remains under the predetermined threshold value $V_0$.

The control filtered front wheel speeds $CV_{FR}$ and $CV_{FL}$ are obtained by limiting the amount of change on both of the accelerating and decelerating sides. When the current value of the filter front wheel speed is greater than the previous value of the control filtered front wheel speed by an amount exceeding the predetermined increase limit, then the current control filtered front wheel speed is set equal to the sum of the pervious value of the control filtered speed and the increase limit. When the increase between the current value of the filtered speed and the previous value of the control filtered front wheel speed is smaller than the increase limit, then the current value of the control filtered front wheel speed is set equal to the current value of the filtered speed. When the current value of the filtered front wheel speed is smaller than the previous value of the control filtered front wheel speed by an amount exceeding a predetermined decrease limit, then the control speed is set equal to the difference resulting from subtraction of the decrease limit from the previous value of the control speed. When the decrease between the current filtered value and the previous control value is smaller than the decrease limit, than the control speed is set equal to the current filtered value. Therefore, the sensed front wheel speed and the control filtered front wheel speed do not differ too much from each other when the wheel speed changes from deceleration to acceleration as shown in FIG. 7. Thus, the control filtered front wheel speed follows up the sensed front wheel speed without too much delay. By using this control filtered front wheel speed for detection of deceleration and acceleration slips, the detecting system can estimate a deceleration or acceleration slip correctly without overestimation or underestimation. Moreover, the detection system can estimate a pseudo acceleration slip in a hydroplaning condition at a moderate acceleration slip S2 as shown in FIG. 8 while it is estimated at an excessive acceleration slip S1 when the sensed wheel speed is used.

(C) Hydroplaning Adaptive Control

Figure 9:
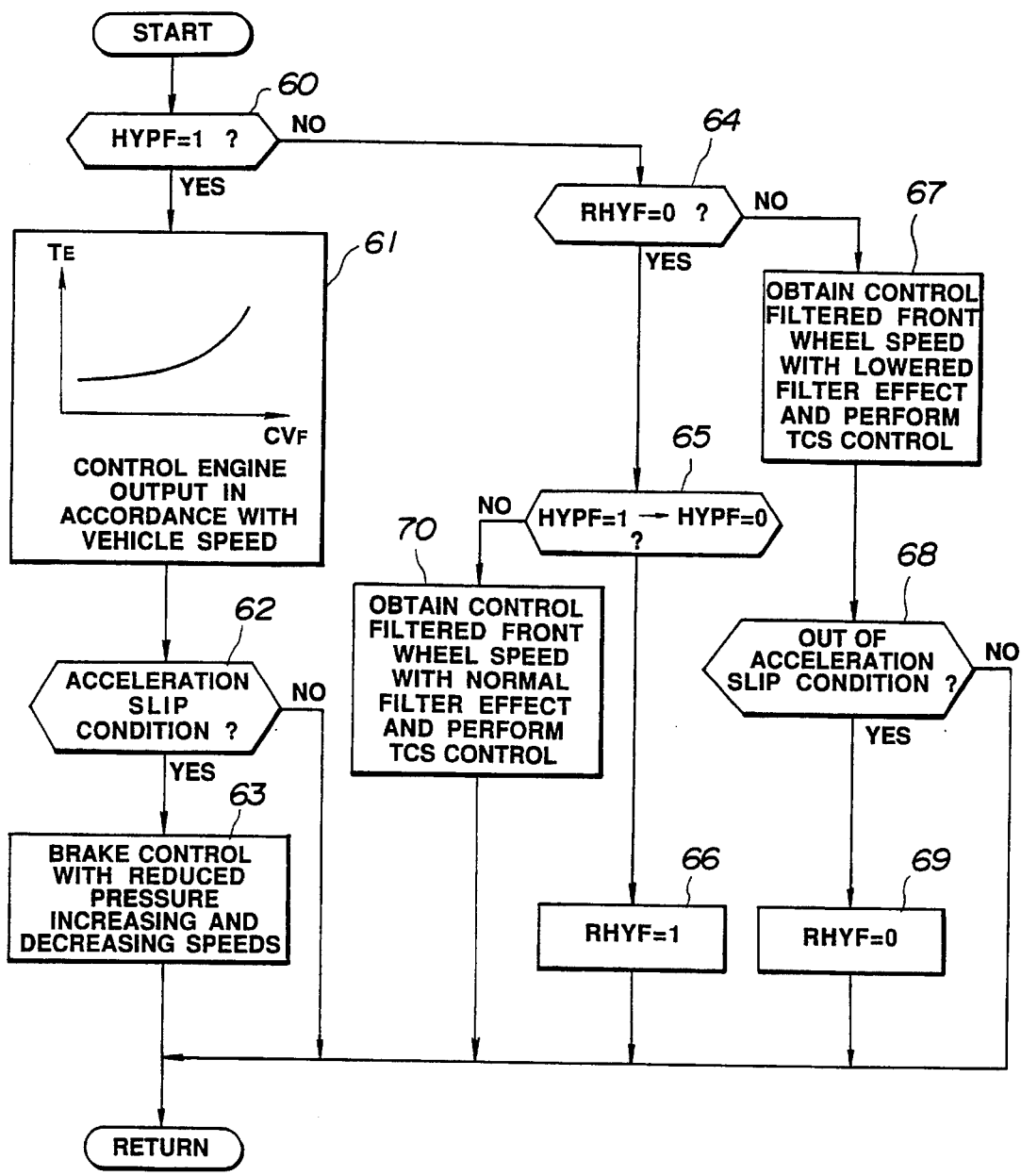
FIG. 9 is a flow chart showing a hydroplaning adaptive control performed by the control system of this embodiment.

FIG. 9 shows a control procedure which the main control unit TCS/ABS-ECU performs when the hydroplaning condition is detected.

At a step 60, the main control unit determines whether the hydroplaning flag HYPF is equal to one or not, to know if the hydroplaning condition exists.

If HYPF=1, then main control unit proceeds to a step 61. There, the control unit controls an engine output $T_E$ so as to hold the vehicle speed $CV_F$ constant at a then-existing vehicle speed value, by manipulating the opening degree of the second throttle valve 21. In this example, the control unit determines the vehicle speed $CV_F$ by averaging the control filtered front right and left wheel speeds $CV_{FR}$ and $CV_{FL}$. Therefore, the vehicle speed $CV_F$ of this example is equal to the average (arithmetic mean) of $CV_{FR}$ and $CV_{FL}$. In this example, the control unit controls the engine output $T_E$ so as to satisfy $TE = \alpha \times CV_F^2 + \beta$. In this equation (wherein $\alpha$ and $\beta$ are constants), the first term $\alpha \times CV_F^2$ is a component of air resistance which is proportional to the second power of the vehicle speed, and $\beta$ is a component of rolling resistance. Thus, the control unit controls the engine output $T_E$ in accordance with the vehicle speed.

At a step 62, the main control unit determines whether an acceleration slip condition exists or not. For example, the main control unit detects the acceleration slip condition by monitoring a difference between a filtered rear wheel speed and the control filtered front wheel speed.

If the acceleration slip condition exists and therefore the answer of the step 62 is affirmative, then the main control unit proceeds to a step 63 to perform a brake control by using a pressure increasing speed and a pressure decreasing speed which are made lower below normal.

If the answer of the step 60 is negative (that is, HYPF=0), then the main control unit proceeds from the step 60 to a step 64 to determine whether a recovery flag (or recovery-from-hydroplaning flag) RHYF is zero, or not. If RHYF=0, then the main control unit determines, at a next step 65, whether the hydroplaning flag HYPF has just changed from one to zero. If the answer of the step 65 is affirmative, then the main control unit sets the recovery flag RHYF to one (RHYF=1) at a step 66. In this way, the recovery flag RHYF is set to one at the step 66 immediately when HYPF has changed from one to zero; that is when the hydroplaning flag HYPF is zero in the current execution of the step 60 although HYPF was one in the previous execution of the step 60.

Once the recovery flag RHYF is set to one, the answer of the step 64 becomes negative, and the main control unit reaches a step 67. At the step 67, the main control unit determines the control filtered front wheel speeds by lowing the filtering effect, and performs the traction throttle control and the traction brake control.

Then, at a step 68, the main control unit determines whether the acceleration slip condition is absent or not. If the answer of the step 68 is affirmative (that is, the acceleration slip condition does not exist), then the main control unit resets the recovery flag RHYF to zero (RHYF=0) at a step 69.

After the recovery flag RHYF has been set to zero at the step 69, the answer of the step 64 becomes affirmative, and the answer of the step 65 becomes negative. Therefore, the main control unit proceeds from the step 65 to a step 70. At the step 70, the main control unit determines the control filtered front wheel speeds by using a normal filtering effect, and performs the traction throttle control and traction brake control.

In this hydroplaning adaptive control, when the vehicle falls in the hydroplaning condition, the control is transferred through the steps 60→61→62→63. Therefore, the main control unit performs the throttle control, irrespective of whether the acceleration slip is present or not, and controls the engine output $T_E$ so as to maintain the vehicle speed obtained when the vehicle plunges into the hydroplaning condition. On the other hand, the brake control is performed only when the acceleration slip is detected. When the acceleration slip is detected while HYPF=1, then the main control unit controls the brake pressures with a low control gain.

In this way, the main control unit holds the vehicle speed substantially at the speed value at the time of beginning of the hydroplaning condition. Therefore, this control system prevents an excessive vehicle deceleration by preventing the throttle valve from being closed excessively when the vehicle speed is high, and maintains the vehicle stability by preventing the throttle valve from being opened too much when the vehicle speed is low.

On the other hand, a conventional control system continues controlling the throttle opening in accordance with the acceleration slip even in the hydroplaning condition. Therefore, the conventional control system tends to overestimate the drive wheel slip because of a steep decrease of the undriven wheel speed in the hydroplaning condition, and tends to control the throttle opening in accordance with the overestimated drive wheel slip. As a result, the conventional control system increases the vehicle deceleration by decreasing the throttle opening too much in the high vehicle speed range in which an engine output reducing response is low. In a low vehicle speed range in which the engine output reducing response is high, the conventional control system opens the throttle too much, and becomes unable to control the slip, so that the vehicle stability becomes worse. The control system according to this embodiment of the present invention, by contrast, provides good control performances by controlling the throttle opening independently of the acceleration slip. In the high vehicle speed range, the second throttle valve 21 is opened wider as compared with the conventional control based on the acceleration slip. In the low vehicle speed range, the opening degree of the second throttle valve 21 is decreased as compared with the conventional control based on the acceleration slip.

Figure 10:
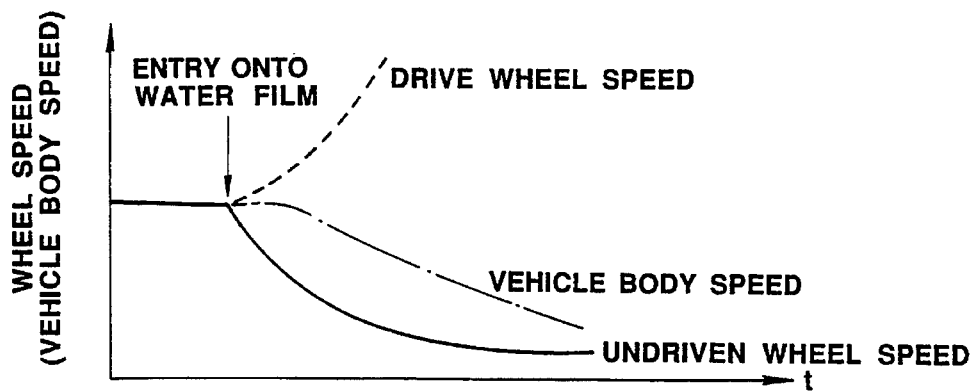
FIG. 10 is a graph showing characteristics of the vehicle body speed, drive wheel speed and undriven wheel speed when the acceleration is depressed after the vehicle has plunged into the hydroplaning condition.
Figure 11:
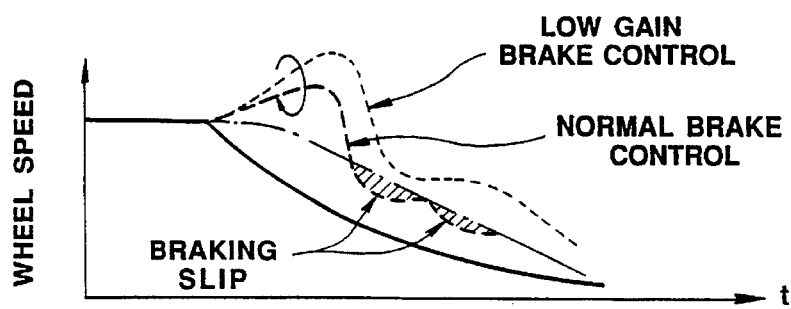
FIG. 11 is a graph showing characteristics of the drive wheel slip obtained when the brake control is performed after the plunge into the hydroplaning condition with a normal control gain and a reduced control gain.
Figure 12:
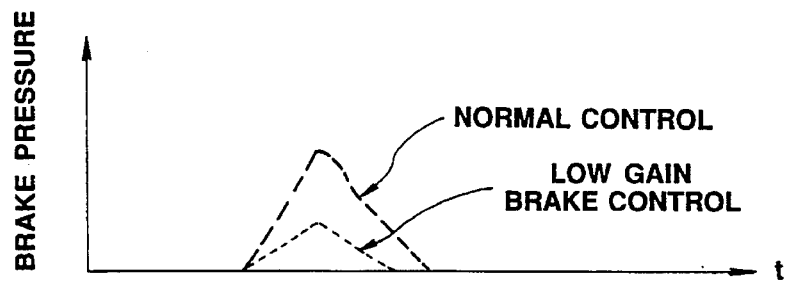
FIG. 12 is a graph showing brake pressure characteristics of the normal gain control and the reduced gain control.

With the brake control of the step 63, the control system of this embodiment can control the acceleration slip during hydroplaning, and improve the vehicle stability. When the accelerator pedal is depressed in the hydroplaning condition, the drive wheels start slipping abruptly as shown in FIG. 10 while the undriven wheel speed decreases steeply. In this case, therefore, if the brake control is not performed as in the control system of Japanese Provisional Publication 64-60463, both of the front and rear wheels loose the ability of tire grip. If, on the other hand, the brake control is performed with a normal control gain, the brake control becomes excessive, and the brake pressure is increased too much as shown in FIG. 12, because of overestimation of the acceleration slip caused by the steep decrease of the undriven wheel speed. Therefore, the normal brake control increases the tendency of the drive wheels toward lock, and causes braking slip as shown in FIG. 11. In this case, both of the undriven and drive wheels fall into the braking slip condition, and deteriorate the vehicle stability. The control system of this embodiment, by contrast, prevents the brake pressure from becoming excessive by lowing the control gain, as shown in FIG. 12, and causes the drive wheel speed to settle down to the vehicle body speed without involving the braking slip.

Figure 13:
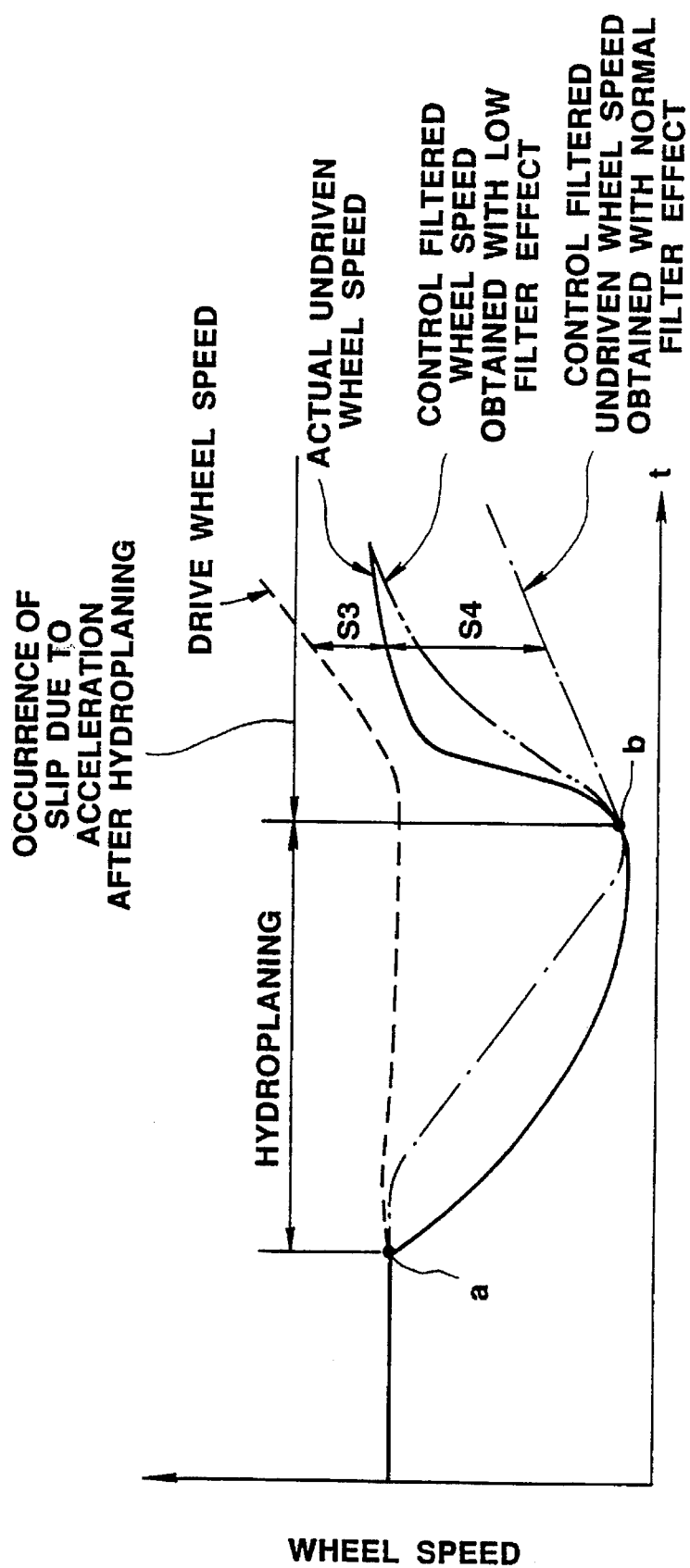
FIG. 13 is a graph showing characteristics of the wheel speed obtained when the accelerator pedal is depressed after an escape from the hydroplaning condition.

The recovery control of the steps 64–70 is performed when the vehicle has escaped from the hydroplaning condition. When the vehicle has got rid of the hydroplaning condition, the main control unit takes the route of the steps 60→64→65→66, and sets the recovery flag RHYF to one. Then, in the next control cycle, the main control unit proceeds from the step 64 to the step 67, and performs the traction control by using the control filtered front wheel speeds obtained by lowering the filter effect. Therefore, this control system ensures the ability of acceleration of the vehicle immediately after hydroplaning. After the hydroplaning condition, the control filtered front wheel speed obtained with the normal filter effect does not immediately follow the recovery of the actual front wheel speed, but lags behind as shown by a one dot chain line in FIG. 13. Therefore, the acceleration slip calculated with reference to this control filtered undriven wheel speed amounts to a sum of S3+S4, as shown in FIG. 13, while the actual acceleration slip is only S3. This overestimation of the acceleration slip causes an excessive acceleration slip control. The control system of this embodiment avoids such an overestimation by employing the control filtered undriven wheel speed obtained with the lowered filter effect in calculation of the acceleration slip. The control filtered undriven wheel speed obtained with the lowered filter effect follows the actual undriven wheel speed more faithfully as shown by a two dot chain line in FIG. 13.

When the acceleration slip condition is eliminated, the main control unit resets the recovery flag RHYF to zero at the step 69, and then reaches the step 70 through the steps 60→64→65. At the step 70, the main control unit determines the control filtered front wheel speeds by using the normal filter effect suitable for detection of the hydroplaning condition, and performs the traction control by using thus-determined control filtered front wheel speeds.

Figure 14:
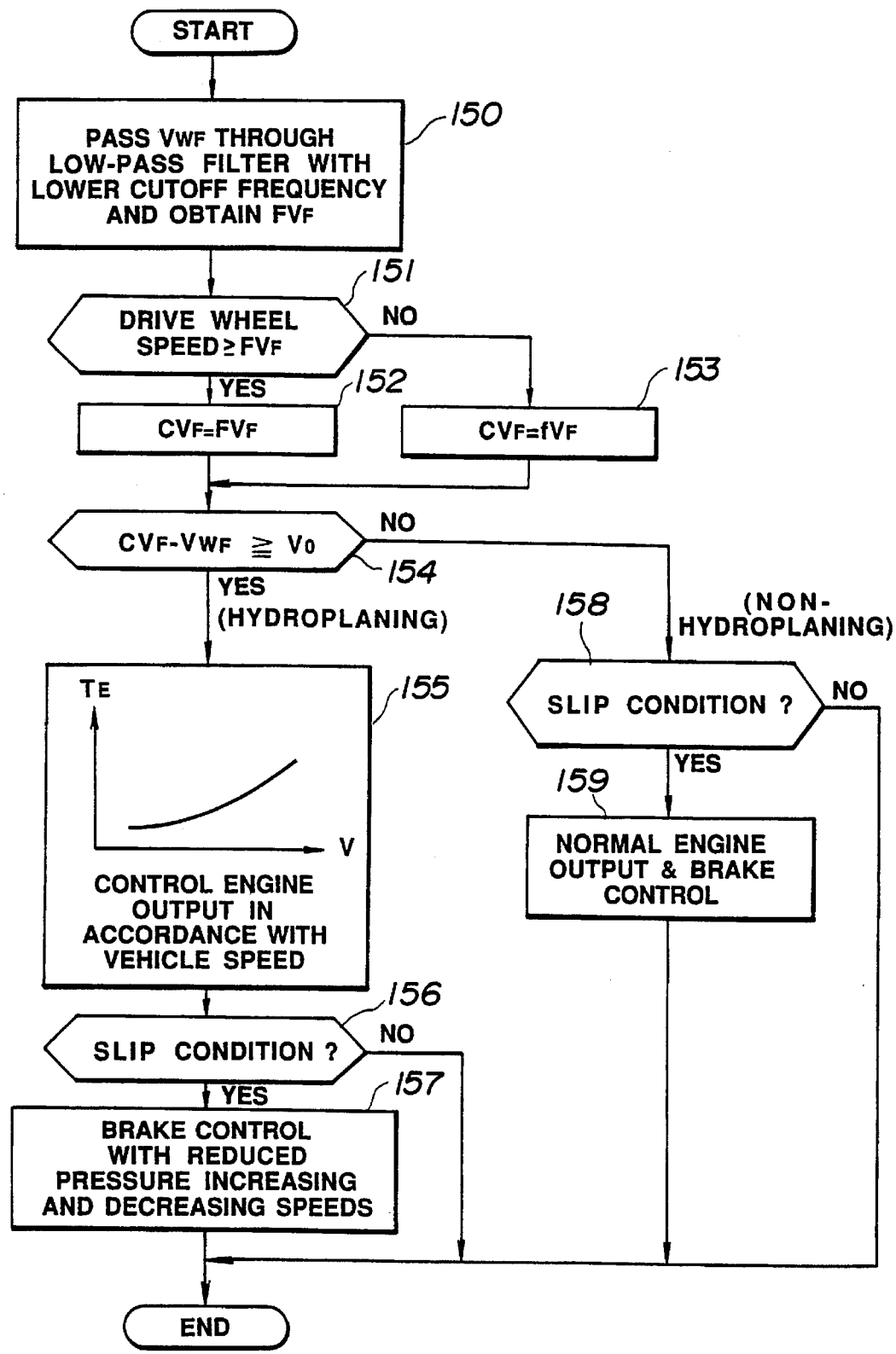
FIG. 14 is a flow chart showing another example of a control procedure performed by the control system of this embodiment.

FIG. 14 shows another example of the control procedure performed by the main control unit TCS/ABS-ECU.

At a step 150 shown in FIG. 14, the main control unit determines the filtered undriven wheel speed $FV_F$ by passing the sensed undriven wheel speed $V_{WF}$ (the sensed front right wheel speed $V_{WFR}$ from the front right wheel speed sensor 1, and the sensed front left wheel speed $V_{WFL}$ from the front left wheel speed sensor 2) through a low-pass filter which has a relatively low cutoff frequency, so that the filtering effect is higher.

In this example, the filtered undriven wheel speed $FV_F$ is determined by limiting the amount of variation in the step 150 in the same manner as the method of the step 51 shown in FIGS. 5, 6 and 7. When the filtered undriven wheel speed $FV_F$ is smaller than the sensed drive wheel speed $V_R$, then the main control unit prevents the slope from exceeding +0.4G as shown in FIG. 6, on the side on which the sensed undriven wheel speed $V_F$ is higher than the filtered undriven wheel speed $FV_F$, after an initial time interval of 10 msec (a processing cycle of 10 msec) in which the filtered speed is held constant. On the side on which sensed undriven wheel speed $V_F$ is lower than the filtered undriven wheel speed $FV_F$, within a first interval of 2 sec, the main control unit holds the filtered speed constant for an initial interval of 10 msec, and then limits the deceleration to −0.1G. Thereafter, the slope is prevented from exceeding −0.35G. In this way, the upward and downward slopes are prevented from becoming excessively steep. When the filtered undriven wheel speed $FV_F$ is greater than the sensed drive wheel speed $V_R$, then the main control unit prevents the slope on the decelerating side from exceeding −1.13G, as shown in FIG. 7.

At a next step 151, the main control unit compares the sensed drive wheel speed $V_R$ (the sensed rear right wheel speed $V_{RR}$ from the rear right wheel speed sensor 3, and the sensed rear left wheel speed $V_{RL}$ from the rear left wheel speed sensor 4) with the filtered undriven wheel speed $FV_R$ obtained at the step 150.

If $V_R \geq FV_F$, the main control unit proceeds from the step 151 to a step 152. At the step 152, the main control unit sets the control filtered undriven wheel speed $CV_F$ equal to the filtered undriven wheel speed $FV_F$ without further modification. Thus, the filter front wheel speed $FV_F$ obtained at the step 150 is regarded as $CV_F$.

If, on the other hand, $V_R < FV_F$, the main control unit proceeds from the step 151 to a step 153. At the step 153, the main control unit sets the control filtered undriven wheel speed $CV_F$ equal to a filtered undriven wheel speed $fV_F$ which is determined by passing the sensed undriven wheel speed through a low-pass filter having a relatively high cutoff frequency, and accordingly having a low filter effect.

At a step 154, the main control unit determines whether the hydroplaning condition is present or not, by determining whether the difference between the control filtered undriven wheel speed $CV_F$ and the sensed undriven wheel speed $V_{WF}$ is equal to or greater than the predetermined entrance threshold value $V_0$ (5 km/h, for example).

If $CV_F - V_{WF} \geq V_0$, the main control unit proceeds to a step 155, and controls the engine output $T_E$ by manipulating the second throttle valve 21 in the same manner as in the step 61 shown in FIG. 9.

At a next step 156, the main control unit determines whether the acceleration slip condition is present or not. For example, the main control unit detects the acceleration slip condition by monitoring the difference between sensed drive wheel speed $V_R$ and the control filtered undriven wheel speed $CV_F$. In this case, it is possible to use a filtered drive wheel speed $fV_R$ instead of the sensed drive wheel speed VR. The filtered driven wheel speed $fV_R$ is determined by passing the sensed driven wheel speed through a low-pass filter having a relatively high cutoff frequency and having a low filter effect.

At a next step 157, the main control unit performs the brake control with the reduced pressure increasing and decreasing speeds. The steps 155, 156 and 157 correspond the steps 61, 62 and 63 shown in FIG. 9.

If $CV_F - V_{WF} < V_0$, then the main control unit proceeds from the step 154 to a step 158. At the step 158, the main control unit determines whether the acceleration slip is present or not, by monitoring the difference between the sensed driven wheel speed $V_R$ and the control undriven wheel speed $CV_F$ as in the step 156.

If the answer of the step 158 is affirmative, the main control unit proceeds to a step 159, and performs, at this step, the normal traction throttle and brake controls as mentioned above in (A) (Normal Traction Control).

In the hydroplaning condition in which the actual undriven wheel speed decreases steeply by the effect of a water film on a road surface, the control filtered undriven wheel speed $FV_F$ becomes smaller than the sensed driven wheel speed $V_R$, and the main control unit takes the route of the steps 150→151→152→ 154→155→156→157. Therefore, the main control unit sets the control undriven wheel speed $CV_F$ at the step 152 so that the large filter effect remains, and then estimates the acceleration slip at the step 156 by using this control undriven wheel speed $CV_F$, and the drive wheel speed $V_R$ (or $fV_R$). Therefore, it is possible to avoid overestimation of the acceleration slip, and thereby to prevent an excessive TCS brake control action at the step 157.

Figure 15:
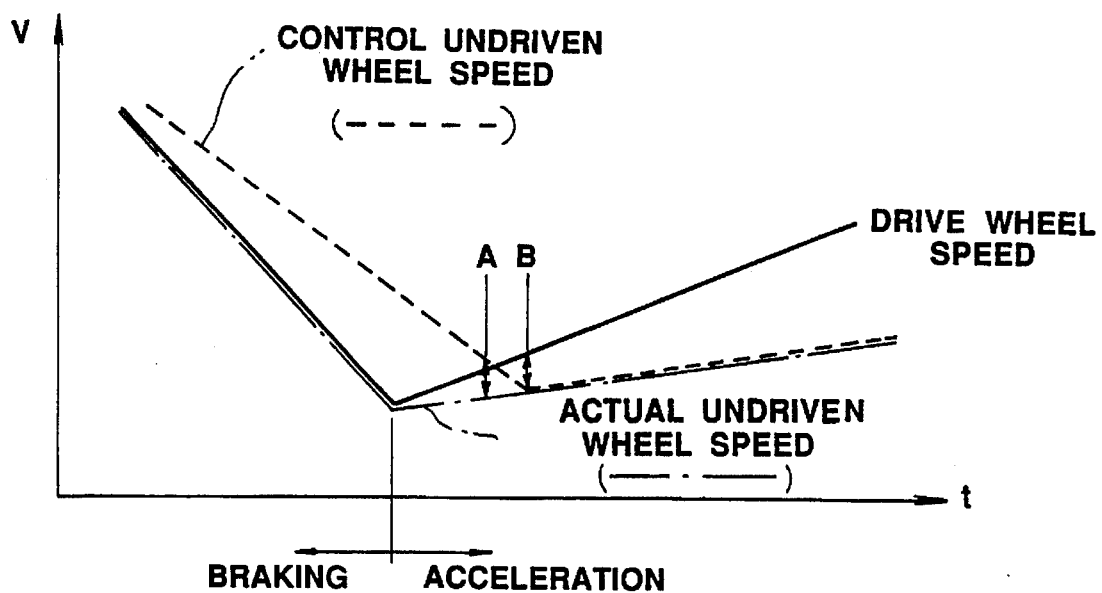
FIG. 15 is a graph showing characteristics of the drive and undriven wheel speeds to show operation of the control procedure of FIG. 14.

In the case of a re-acceleration slip which occurs in a transition from braking deceleration to acceleration, the control is performed as follows. From the braking deceleration range to the early stage of acceleration, the filtered undriven wheel speed $FV_F$ becomes greater than the sensed drive wheel speed $V_R$. Therefore, the main control unit takes the route of the steps 150→ 151→153→154→158→159. Therefore, at the step 153, the main control unit employs, as the control undriven wheel speed $CV_F$, the filtered undriven wheel speed $fV_F$ determined with the lowered filter effect. As a result, the control undriven wheel speed $CV_F$ tracks the actual undriven wheel speed faithfully, and the difference between the sensed driven wheel speed $V_R$ and the control undriven wheel speed $CV_F$ exceeds the predetermined threshold earlier at a point A in time shown in FIG. 15, as compared with a later point B. Therefore, the control system can start the acceleration slip control promptly without delay. Japanese Patent Provisional Publication 62-99251 shows a traction control system. This conventional system places a predetermined upper limit on the amount of change of the undriven wheel speed on the deceleration side, and then determines the acceleration slip. This system, however, modifies the undriven wheel speed independently of whether the drive wheel speed is greater than the undriven wheel speed. Therefore, this conventional system can not detect the re-acceleration slip promptly.

In this example of FIG. 14, the control system is designed to determine the control undriven wheel speed $CV_F$ by setting the upper limit of the amount of change on the deceleration side at a high value when the filtered undriven wheel speed is higher than the sensed drive wheel speed, and setting the upper limits of the amount of change on the acceleration and deceleration sides to low levels when the filtered undriven wheel speed $FV_F$ is lower than the sensed drive wheel speed $V_R$. In a plunge into the hydroplaning condition, therefore, this control system can avoid overestimation of the acceleration slip more reliably by using a high limiter effect in determining the control undriven wheel speed $CV_F$. In a transition from braking to acceleration, the control undriven wheel speed $CV_F$ is obtained with a low limiter effect, so that it is possible to avoid overestimation of the deceleration slip without retarding the initiation of the control to the re-acceleration slip.

Figure 16:
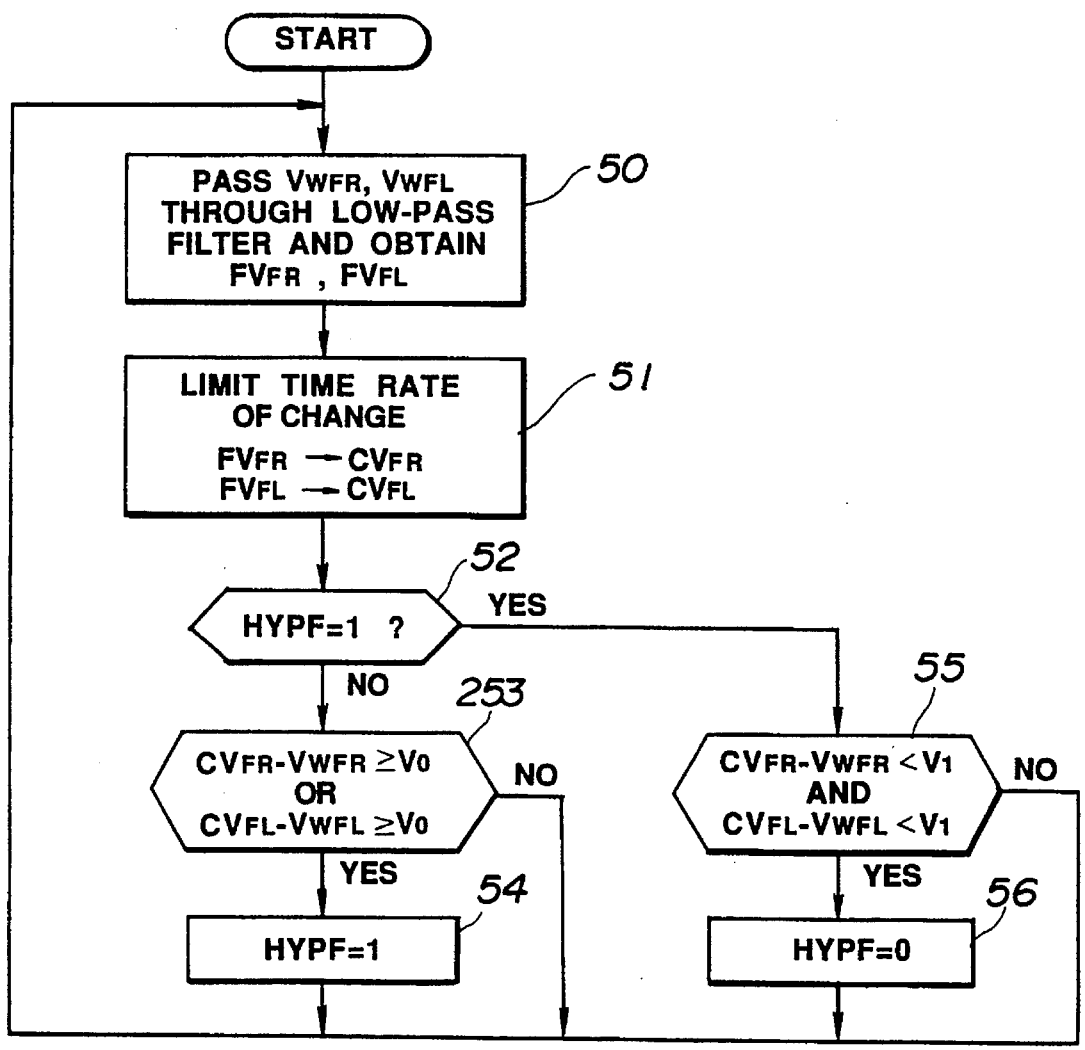
FIGS. 16 and 17 are flow charts showing still another example of a control procedure performed by the control system of this embodiment.
Figure 17:
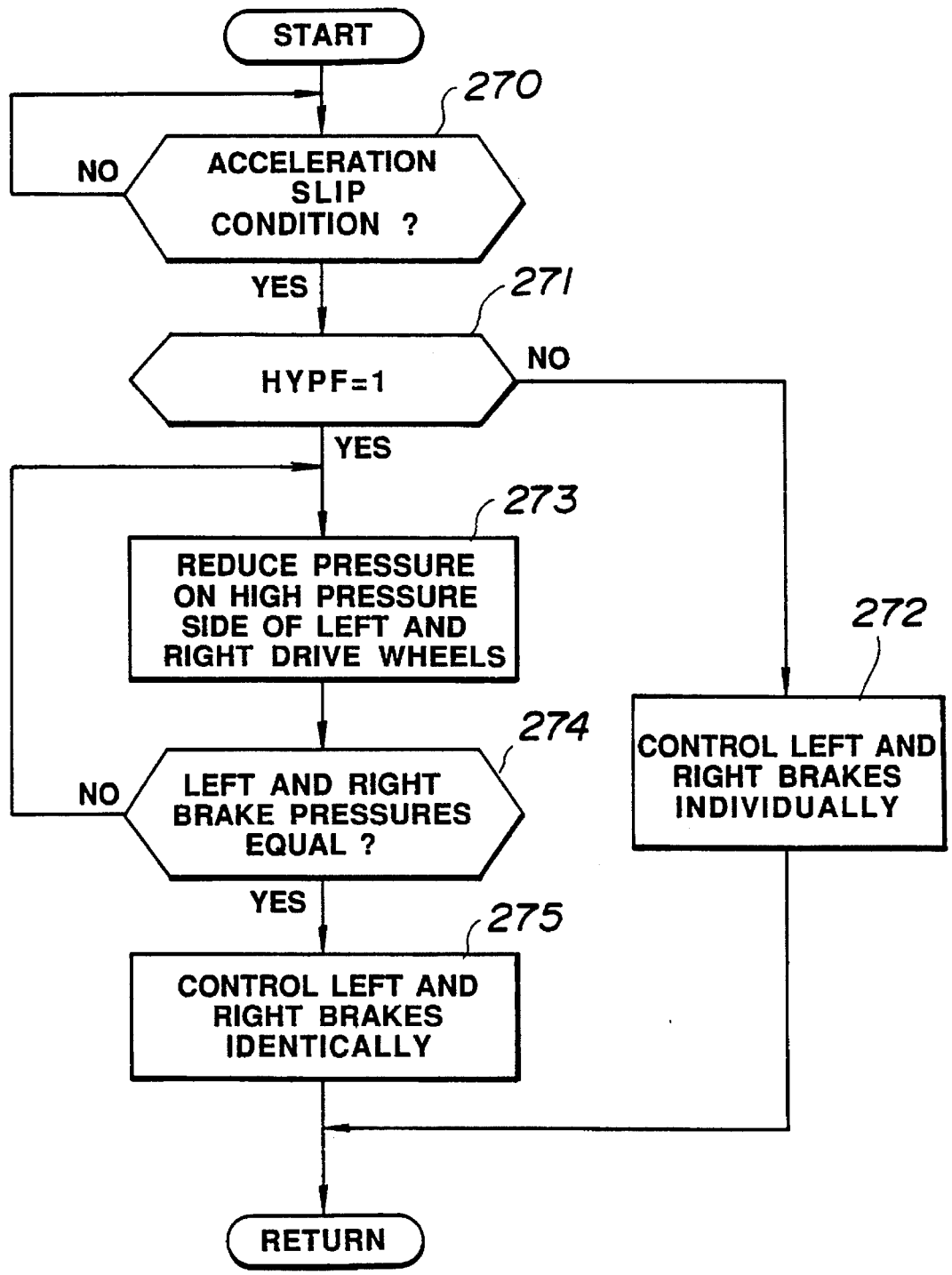

FIGS. 16 and 17 show a third example of the control procedure performed by the main control unit TCS/ABS-ECU. The procedure shown in FIG. 16 is almost the same as the procedure shown in FIG. 5. In FIG. 16, however, the step 53 of FIG. 5 is replaced by a step 253. When the hydroplaning flag HYPF is zero, the main control unit proceeds from the step 52 to the step 253 as shown in FIG. 16. At the step 253, the main control unit produces an affirmative answer when $CV_{FR} - V_{WFR} \geq V_0$ or $CV_{FL} - VW_{FL} \geq V_0$. If the condition of the step 253 is satisfied, then the main control unit proceeds to the step 54 to set the hydroplaning flag HYPF to one.

At a step 270 shown in FIG. 17, the main control unit determines whether the acceleration slip to start the TCS control is present or not. The check of the step 270 is performed for both the left and right drive wheels independently and individually. If the answer of the step 270 is YES, then the main control unit determines, at a next step 271 whether HYPF is one or not. If HYPF=0, the main control unit controls, at a step 272, the brakes of the left and right drive wheels in accordance with their respective acceleration slip conditions independently and individually.

If HYPF=1, the main control unit proceeds from the step 271 to a step 273. At the step 273, the main control unit compares the brake pressures for the left and right drive wheels, and decreases the higher brake pressure.

At a next step 274, the main control unit determines whether the left and right brake pressures for the left and right drive wheels are equal to each other. If they are not equal, the main control unit repeats the step 273 to further reduce the brake pressure of the higher side until the left and right brake pressures become equal.

When the equality of the left and right drive wheel brake pressures is confirmed at the step 274, then the main control unit initiates a common brake control to control the left and right drive wheel brake pressure identically, instead of the individual brake control of the step 272.

When the hydroplaning condition does not exist, the main control unit takes the route of the steps 270→271→272, and controls the left and right drive wheel brake pressures in the individual control mode at the step 272. The braking forces of each of the left and right drive wheels is controlled in accordance with its own acceleration slip amount independently of the braking force of the other drive wheel.

If the hydroplaning condition occurs on a wet road surface or a split friction road surface, the main control unit takes the route of the steps 270→271→273→274→275, and performs the hydroplaning adaptive one-channel brake control instead of the two channel individual brake control of the step 272.

If only one of the left and right wheels falls in the hydroplaning condition on a low friction surface, this one channel brake control of the step 275 can prevent an undesired yawing moment of the vehicle which would be produced by the two channel brake control. Therefore, the control system can ensure the stability of the directional behavior of the vehicle.

Figure 18:
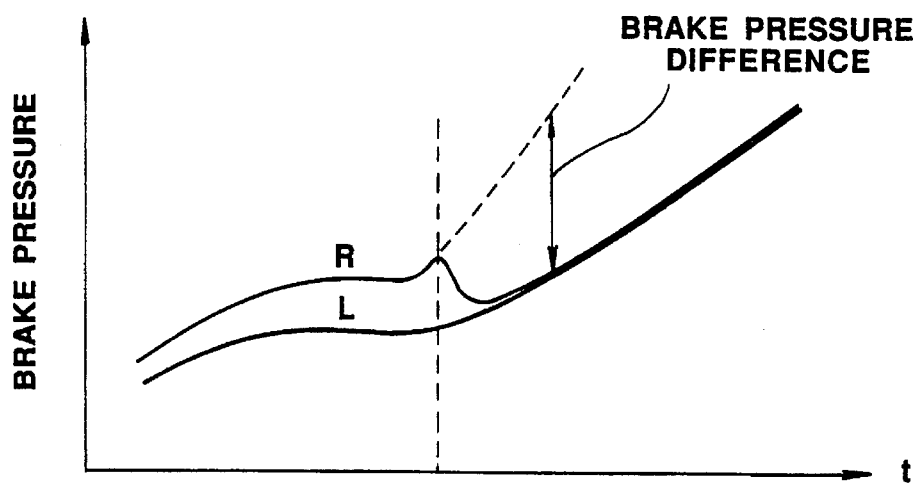
FIG. 18 is a graph showing right and left brake pressures controlled by the control procedure of FIGS. 16 and 17.

When the right drive wheel falls in the hydroplaning condition, this control system controls the left and right drive wheel brake pressures as shown by solid lines in FIG. 18. The left and right brake pressure difference causative of the undesired yawing movement is reduced to zero very shortly after the plunge into the hydroplaning of the right drive wheel. The individual brake control system (such as a traction control system disclosed in Japanese Patent Provisional Publication No. 60-56662) would increase the difference between the left and right brake pressures as shown by a broken line in FIG. 18. In the hydroplaning condition, this control system according to the present invention continues the one channel TCS brake control on the lower pressure side without inhibiting the TCS brake control altogether (as in the traction system of the above-mentioned Japanese Patent Provisional Publication No. 64-60463). Therefore, even if the accelerator pedal is depressed in the hydroplaning condition, this control system can control the brake pressures to suppress an abrupt drive wheel slip.

The vehicle control system shown in FIGS. 2–4, and the three examples of the control procedures shown in FIGS. 5 and 9, FIG. 14, and FIGS. 16 and 17 contain various aspects of the present invention as shown in FIGS. 1A–1G.

Figure 1A:
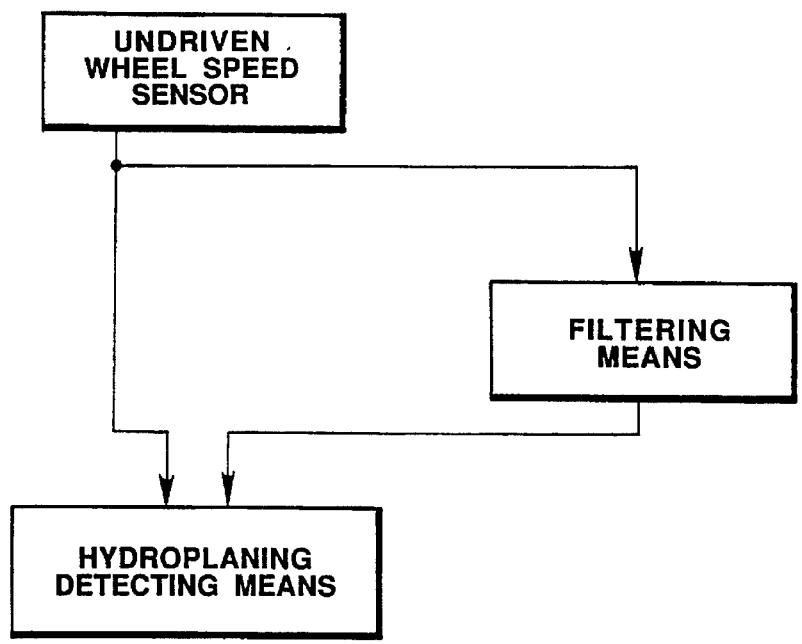

As shown in FIG. 1A, a system according to a first aspect of the invention is a hydroplaning detecting system which comprises an undriven wheel speed sensor, a filtering means, and a hydroplaning detecting means. In the example of FIG. 5, the filtering means corresponds to the step 50, or the combination of the steps 50 and 51, and the hydroplaning detecting means corresponds to the step 53 or the program section consisting of the steps 52–56. When the vehicle has plunged into the hydroplaning condition, the undriven wheel sensor signal drops steeply while the output of the filtering means decreases more sluggishly by the effect of the low-pass filter of the filtering means. By monitoring the difference between both signals, this system can detect the hydroplaning condition accurately from its beginning to its end. The hydroplaning detection system shown in FIG. 1A is usable not only in the vehicle traction control system, but also any other vehicle control system which is required or desired to adapt its control characteristic depending on whether the hydroplaning condition does exist or not.

Figure 1B:
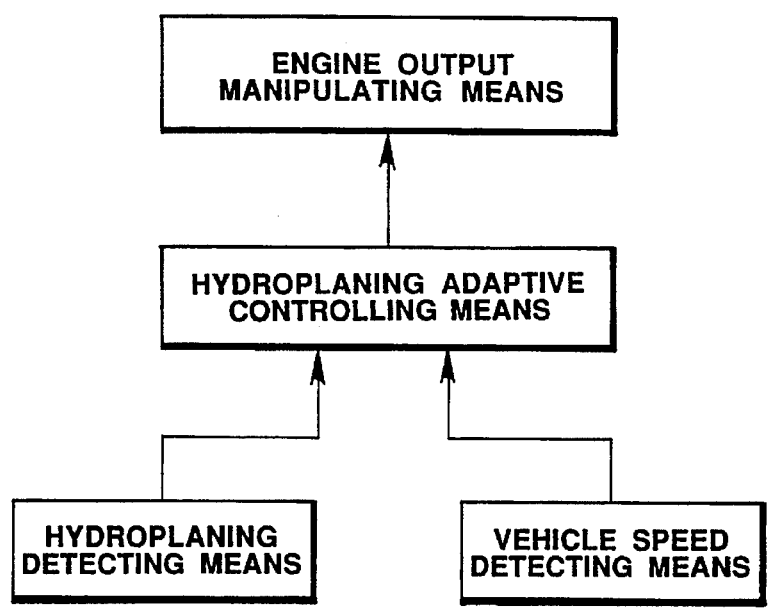

FIG. 1B shows a second aspect of the present invention. A system shown in FIG. 1B comprises an engine output manipulating means comprising an actuator unit such as the throttle motor 18; a hydroplaning detecting means for detecting the hydroplaning condition of the vehicle by the hydroplaning detection method of the present invention, or the convention hydroplaning detecting method; a means for detecting a vehicle speed of the vehicle; and a hydroplaning adaptive controlling means which controls the engine output by sending a control signal to the engine output manipulating means. This controlling means controls the engine output so as to maintain the vehicle speed when the hydroplaning condition is detected. The engine output manipulating means may be a throttle opening manipulating means as in the illustrated embodiment, or may be some other means for varying an engine output torque by controlling a fuel cut of the engine, or a retardation of an ignition timing.

Figure 1C:
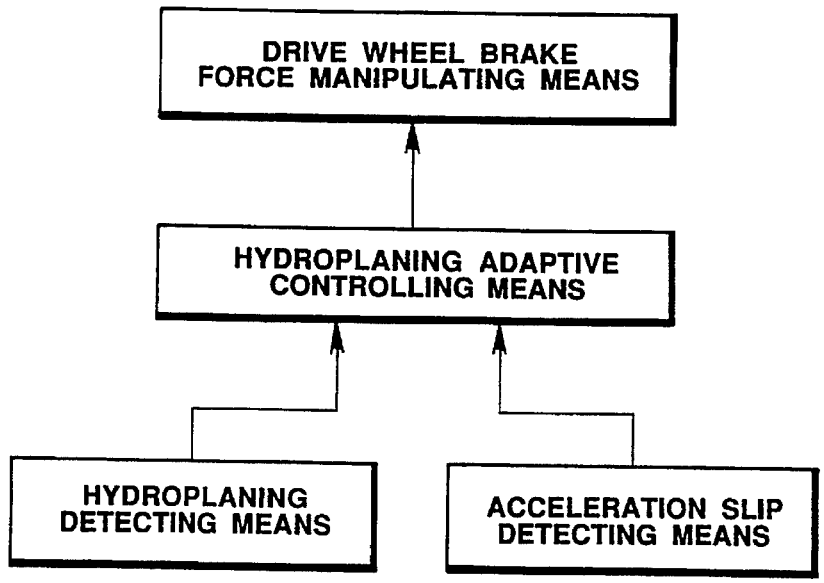

A system shown in FIG. 1C comprises a drive wheel brake force manipulating means comprising a component such as the hydraulic unit TCS/ABS-HU for varying a braking force of at least one drive wheel of the vehicle; the hydroplaning detecting means for detecting the hydroplaning condition by the new method of the present invention or the conventional method; an acceleration slip detecting means for detecting an acceleration slip condition of the drive wheel; and a hydroplaning adaptive controlling means for controlling the traction of the vehicle by sending a brake control signal to the drive wheel force manipulating means in accordance with the acceleration slip. When the hydroplaning condition is detected, this hydroplaning adaptive controlling means reduces a control gain, and produces the brake control signal with the reduced control gain.

Figure 1D:
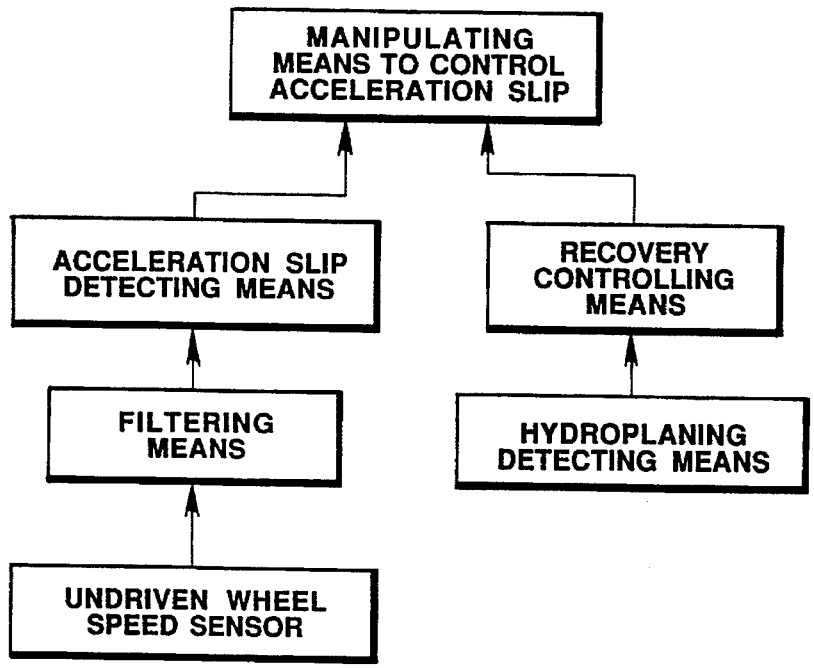

A system shown in FIG. 1D comprises a manipulating means for varying a traction of the vehicle to control an acceleration slip in response to a traction control signal; an undriven wheel speed sensor; a filtering means similar to the filtering means shown in FIG. 1A; an acceleration slip detecting means for detecting an acceleration slip of at least one drive wheel of the vehicle by using the filtered undriven wheel speed; a hydroplaning detecting means; and a recovery controlling means which detects the acceleration slip by using an undriven wheel speed obtained with a weakened filter effect, instead of the filtered undriven wheel speed, and producing the traction control signal for a predetermined time interval starting from an instant of a transition from the hydroplaning condition to a non-hydroplaning condition. In this case, the recovering controlling means may be arranged to reduce the filter effect to zero, and to use the sensed undriven wheel speed for determining the acceleration slip. In the example shown in FIG. 9, the steps 64–70 correspond to the recovery controlling means.

Figure 1E:
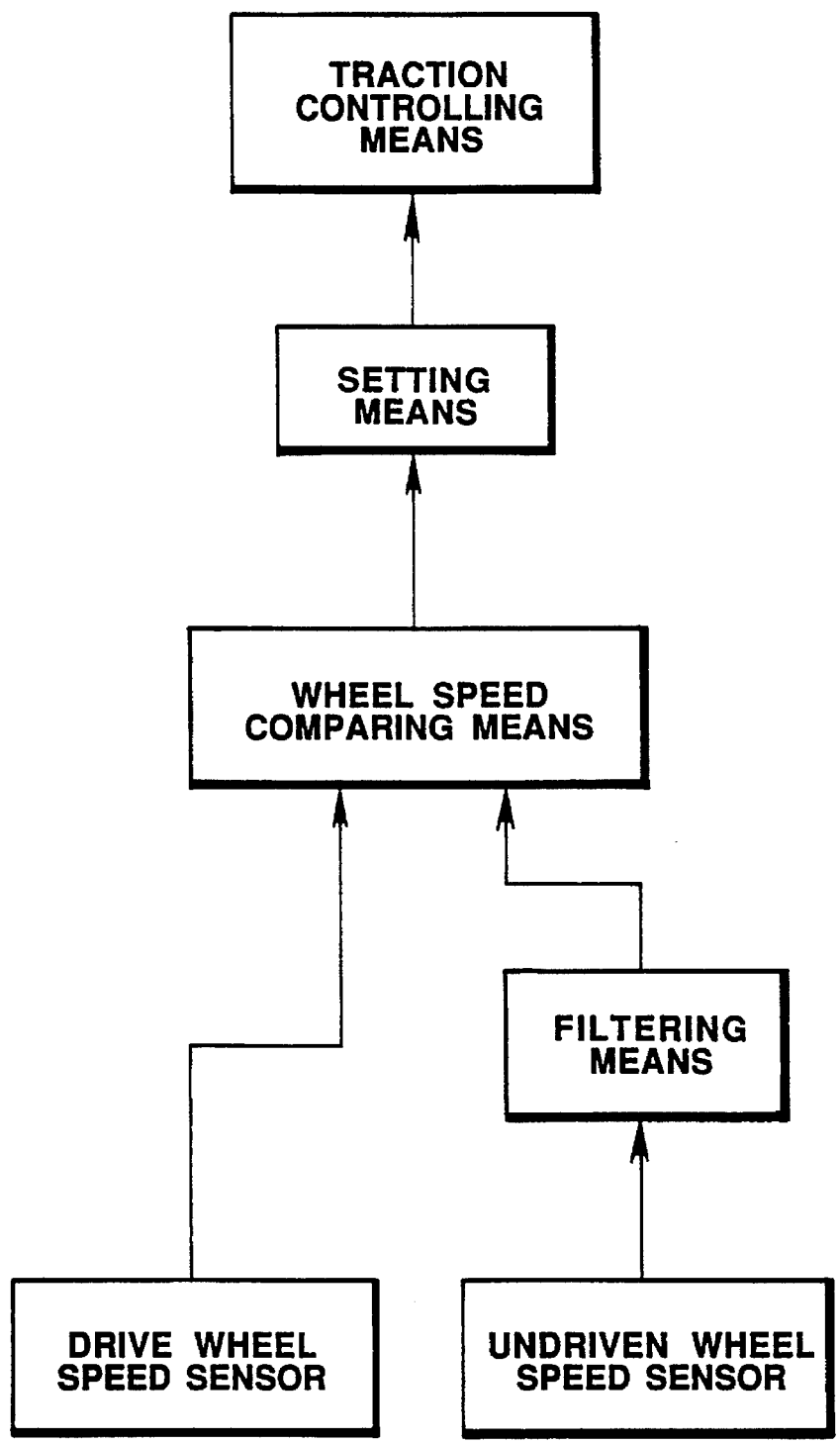

A system shown in FIG. 1E comprises a traction controlling means for controlling a traction of the vehicle to control an acceleration slip in accordance with an acceleration slip condition calculated from a drive wheel speed and a control undriven wheel speed; a drive wheel speed sensor; an undriven wheel speed sensor; a filtering means for determining a control filtered undriven wheel speed by using a low frequency component of the sensed undriven wheel speed below a predetermined cutoff frequency; a wheel speed comparing means for comparing the drive wheel speed and the filtered undriven wheel speed; and a setting means for setting the control undriven wheel speed equal to an undriven wheel speed obtained with a low filter effect when the filtered undriven wheel speed is greater than the drive wheel speed, and to an undriven wheel speed obtained with a great filter effect when the filtered undriven wheel speed is lower than the drive wheel speed.

Figure 1F:
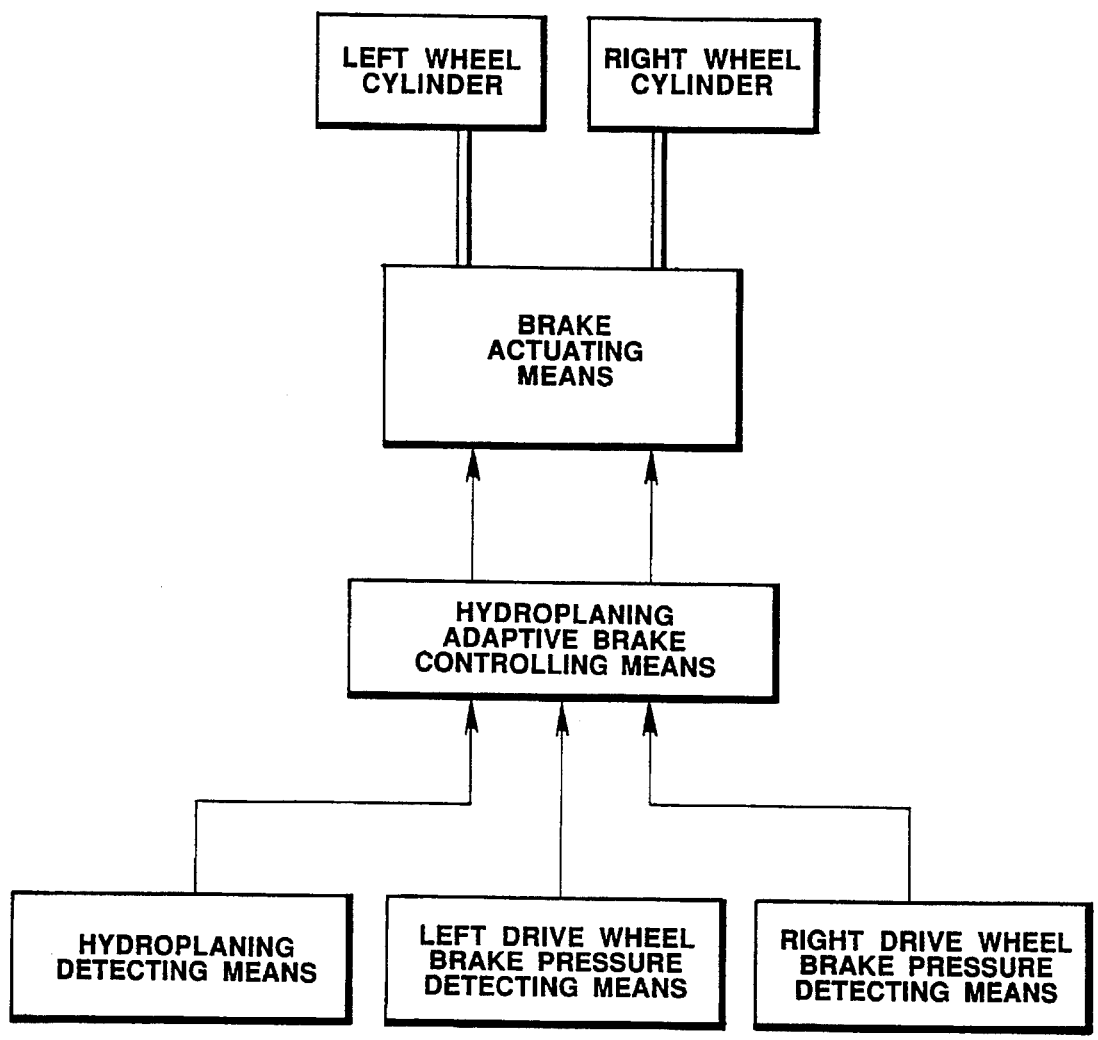

A system shown in FIG. 1F comprises an acceleration slip brake controlling means for controlling left and right brake pressures supplied to wheel cylinders of left and right drive wheels of the vehicle when an acceleration slip occurs; a hydroplaning detecting means for detecting a hydroplaning condition; a brake pressure detecting means for determining the left and right brake pressures for the left and right drive wheels; and a hydroplaning adaptive brake controlling means which, when the hydroplaning condition is detected, makes the left and right brake pressures equal to each other by reducing a higher of the left and right brake pressures, and then controlling the left and right brake pressures identically. The brake pressure detecting means may comprise left and right brake pressure sensors, or may be designed to estimate the left and right brake pressure by using pressure increasing control times and pressure decreasing control time of the left and right brake pressures.

A traction control system shown in FIG. 1G comprises a sensing means for sensing a rotational speed of at least one undriven wheel and producing an undriven wheel speed sensor signal representing a sensed undriven wheel speed; a modifying means for receiving the undriven wheel speed sensor signal as an input signal, and generating an undriven wheel speed modifier signal in accordance with a low frequency component of the undriven wheel speed sensor signal below a predetermined cutoff frequency; a condition detecting means for determining an undriven wheel speed difference by subtracting said undriven wheel sensor signal from said undriven wheel speed modifier signal, and producing a hydroplaning detection signal indicative of existence of a hydroplaning condition when said undriven wheel speed difference is greater than a predetermined threshold; and a traction controlling means for controlling a traction of the vehicle in a normal traction control mode when said hydroplaning detection signal is absent, and in a hydroplaning adaptive mode when said hydroplaning detection signal is present.

Various conventional traction control systems are shown in U.S. Pat. Nos. 3,667,813; 4,637,487; 4,917,208; 4,921,064; 4,951,773; 5,012,882; 5,025,881; 5,038,883; and 5,099,942, and SAE Paper No. 870337 "ASR—Traction Control—A Logical Extension of ABS". Therefore, it is possible to design the normal traction control of the present invention according to the teaching of one or more of these documents. A U.S. Pat. No. 5,063,345 shows one example of a wheel speed sensor which can be used in the present invention.

In the example of FIGS. 5 and 9, the modifying means shown in FIG. 1G corresponds to the steps 50 and 51 performed by the control unit TCS/ABS-ECU which may comprises a microcomputer mounted on the vehicle. The condition detecting means corresponds to the steps 52–56 shown in FIG. 5, and the steps 62, 64–66, 68 and 69 shown in FIG. 9.

A commonly assigned, copending U.S. Pat. No. 5,279,382, based on Japanese Applications Nos. 3-270728, 3-270731 and 3-270734, discloses a similar traction control system.

In the illustrated examples of the present invention, the function of the filtering means is performed by an onboard microcomputer. In this case, the output signal of the wheel speed sensor is inputted to the microcomputer through an appropriate coverlet such as a F/V converter or an A/D converter, and then low-pass filtered within the microcomputer in the manner of a soft (logic) filter. The following expression is the transfer function of one example of the soft filter which can be used in the present invention:

$$H(s) = \frac{1}{1 + T0 \times s} \quad \text{where } T0(\text{time constant}) = 35 \text{ ms.}$$

In the example shown in FIG. 14, the microcomputer of the main control unit treats an average of the left and right drive wheel speeds as the drive wheel speed appearing at the step 151, and treats each of the left and right undriven wheel speeds as $FV_F$. Therefore, the steps 151, 152 and 153 are designed to perform the setting of FVF and fVF for each of the left and right undriven wheel speeds independently of the other. The step 154 of this example is designed to provide an affirmative answer (YES) only when the condition of the step 154 is satisfied for both of the left and right wheels.

What is claimed is:

1. A hydroplaning condition detecting system for a vehicle comprising:

an undriven wheel speed sensor for sensing rotation of an undriven wheel of the vehicle and producing an undriven wheel speed signal representing a sensed undriven wheel speed;

a filtering means for generating a signal representing a filtered undriven wheel speed by subjecting said undriven wheel speed signal to an action of a low-pass filter with a predetermined cutoff frequency; and a condition detecting means for determining a difference resulting from subtraction from said filtered undriven wheel speed of said sensed undriven wheel speed, and generating a hydroplaning detection signal indicative of occurrence of a hydroplaning condition when said difference is equal to or greater than a predetermined value.

2. A hydroplaning condition detecting system according to claim 1 wherein said filtering means includes a means for determining said filtered undriven wheel speed by passing said sensed undriven wheel speed through said low-pass filter, and limiting a time rate of increase of said filtered undriven wheel speed to a predetermined increase upper limit, and a time rate of decrease of said filtered undriven wheel speed to a predetermined decrease upper limit.

3. A hydroplaning condition detecting system according to claim 1 wherein said system further comprises:

an engine output manipulating means for varying an engine output of the vehicle in response to a control signal;

a means for detecting a vehicle speed of the vehicle; and a hydroplaning adaptive controlling means which controls the engine output by producing the control signal so as to maintain the vehicle speed when the hydroplaning condition is detected.

4. A hydroplaning condition detecting system according to claim 1 wherein said system further comprises:

a manipulating means for varying a traction of the vehicle, said manipulating means comprising a brake actuating means for varying a braking force of a drive wheel of the vehicle in response to a brake control signal;

an acceleration slip detecting means for detecting an acceleration slip condition of the drive wheel; and a hydroplaning adaptive controlling means for controlling the traction of the vehicle by producing the brake control signal, the hydroplaning adaptive controlling means including a means which, when the hydroplaning condition is detected and the acceleration slip of the drive wheel exists, produces the brake control signal by using a low brake control gain which is lower than a normal brake control gain which is used in a normal traction control.

5. A hydroplaning condition detecting system according to claim 4 wherein said manipulating means further comprises an engine output actuating means for varying an engine output in response to an engine output control signal, said hydroplaning condition detecting system further comprises a vehicle speed sensing means for sensing a vehicle speed of the vehicle, and said hydroplaning adaptive controlling means includes a means which produces the engine output control signal so as to hold the vehicle speed constant when the hydroplaning condition is detected, and which produces the brake control signal by using the low brake control gain when the hydroplaning condition is detected and the acceleration slip of the drive wheel is detected.

6. A hydroplaning condition detecting system according to claim 1 wherein said system further comprises:

a manipulating means for varying a traction of the vehicle to control an acceleration slip in response to a traction control signal;

an acceleration slip detecting means for detecting an acceleration slip of a drive wheel by using the filtered undriven wheel speed; and a recovery controlling means which detects the acceleration slip by using an undriven wheel speed obtained with a lowered filter effect, instead of said filter undriven wheel speed, and producing the traction control signal, for a predetermined time interval from an instant of a transition from the hydroplaning condition to a condition in which the hydroplaning condition does not exist.

7. A hydroplaning condition detecting system according to claim 1 wherein said system further comprises:

a traction controlling means for controlling a traction to control an acceleration slip in accordance with an acceleration slip condition calculated from a drive wheel speed and a control undriven wheel speed;

a drive wheel speed sensor for sensing the drive wheel speed;

a wheel speed comparing means for comparing the drive wheel speed and the filtered undriven wheel speed; and a setting means for setting the control undriven wheel speed equal to an undriven wheel speed obtained with a low filter effect when the filtered undriven wheel speed is greater than the drive wheel speed, and to an undriven wheel speed obtained with a high filter effect when the filtered undriven wheel speed is lower than the drive wheel speed.

8. A hydroplaning condition detecting system according to claim 1 wherein said system further comprises:

an acceleration slip brake controlling means for controlling left and right brake pressures supplied to wheel cylinders of left and right drive wheels of the vehicle when an acceleration slip occurs;

a brake pressure detecting means for detecting the left and right brake pressures for the left and right drive wheels; and a hydroplaning adaptive brake controlling means which, when the hydroplaning condition is detected, makes the left and right brake pressures equal to each other by reducing a higher of the left and right brake pressures, and then controlling the left and right brake pressures identically.

9. A hydroplaning condition detecting system according to claim 1 wherein said system, further comprises:

a traction controlling means for controlling a traction of the vehicle in a normal traction control mode when said hydroplaning detection signal is absent, and in a hydroplaning adaptive mode when said hydroplaning detection signal is present.

10. A system according to claim 9 wherein said filtering means comprises a low-pass filter means for serving as a low-pass filter having said cutoff frequency, and a limiter means for producing a modified undriven wheel speed signal by preventing a time rate of increase of a filter output signal of said low-pass filter means from exceeding a predetermined acceleration limit, and preventing a time rate of decrease of said filter output signal from exceeding a predetermined deceleration limit.

11. A system according to claim 10 wherein said traction controlling means comprises a hydroplaning adaptive engine controlling means for controlling an engine output of an engine of the vehicle in accordance with a vehicle speed independently of a drive wheel acceleration slip when said hydroplaning detection signal is present.

12. A system according to claim 11 wherein said traction controlling means further comprises a hydroplaning adaptive brake controlling means for controlling a drive wheel brake pressure with a reduced control gain when said hydroplaning detection signal is present and the drive wheel acceleration slip is detected.

13. A system according to claim 12 wherein said hydroplaning condition detecting system comprises a means for sensing a drive wheel speed of a drive wheel of the vehicle which is drivingly connected with the engine, said condition detecting means comprises an acceleration slip detecting means for determining the drive wheel acceleration slip by using said drive wheel speed sensed by said drive wheel speed sensing means, and determining whether a predetermined acceleration slip condition is present or not, and said traction controlling means further comprises a normal traction controlling means for controlling the drive wheel brake pressure in accordance with the acceleration slip with a normal control gain which is higher than said reduced control gain when said hydroplaning detection signal is absent.

14. A system according to claim 13 wherein said acceleration slip detecting means includes a means for determining said acceleration slip by comparing said drive wheel speed with said modified undriven wheel speed signal, and said condition detecting means further comprises a recovery adjusting means which causes said filtering means to lower a filter effect of said low-pass filter from an instant at which said hydroplaning condition becomes nonexistent to an instant at which said acceleration slip condition becomes nonexistent.

15. A system according to claim 14 wherein said normal traction controlling means comprises an individual brake controlling means for controlling left and right drive wheel brake pressures for left and right drive wheels of the vehicle independently, and said hydroplaning adaptive brake controlling means includes a common brake controlling means for controlling said left and right drive wheel brake pressures so that said left and right drive wheel brake pressures remain equal to each other.

16. A system according to claim 14 wherein said condition detecting means comprises a wheel speed comparing means which causes said filtering means to lower the filter effect of said low-pass filter when said modified undriven wheel speed signal is greater than said drive wheel speed, and to heighten the filter effect when said modified undriven wheel speed signal is lower than said drive wheel speed.

17. A system according to claim 13 wherein said undriven wheel speed sensor comprises a front right wheel speed sensor for sensing a front right wheel speed of a front right wheel and producing a front right wheel speed sensor signal representing a sensed front right wheel speed, and a front left wheel speed sensor for sensing a front left wheel speed of said front left wheel and producing a front left wheel speed sensor signal representing a sensed front left wheel speed sensor signal, said filtering means includes a means for producing a front right wheel speed modifier signal in accordance with a low frequency component of said front right wheel speed sensor signal, and a front left wheel speed modifier signal from a low frequency component of said front left wheel speed sensor signal, and said condition detecting means comprises a hydroplaning detecting means which changes said hydroplaning detection signal from an absent state to a present state when a front right wheel speed difference resulting from subtraction of said front right wheel speed sensor signal from said front right wheel speed modifier signal is greater than a predetermined entrance threshold value, and simultaneously a front left wheel speed difference resulting from subtraction of said front left wheel speed sensor signal from said front left wheel speed modifier signal is greater than said entrance threshold value.

18. A system according to claim 13 wherein said undriven wheel speed sensor comprises a front right wheel speed sensor for sensing a front right wheel speed of a front right wheel and producing a front right wheel speed sensor signal representing a sensed front right wheel speed, and a front left wheel speed sensor for sensing a front left wheel speed of said front left wheel and producing a front left wheel speed sensor signal representing a sensed front left wheel speed sensor signal, said filtering means includes a means for producing a front right wheel speed modifier signal in accordance with a low frequency component of said front right wheel speed sensor signal, and a front left wheel speed modifier signal from a low frequency component of said front left wheel speed sensor signal, and said condition detecting means comprises a hydroplaning detecting means which changes said hydroplaning detection signal from an absent state to a present state when a front right wheel speed difference resulting from subtraction of said front right wheel speed sensor signal from said front right wheel speed modifier signal is greater than a predetermined entrance threshold value, or a front left wheel speed difference resulting from subtraction of said front left wheel speed sensor signal from said front left wheel speed modifier signal is greater than said entrance threshold value.

19. A system according to claim 9 wherein said condition detecting means comprises a hydroplaning detecting means for changing said hydroplaning detection signal from an absent state indicative of absence of said hydroplaning condition to a present state indicative of presence of said hydroplaning condition when said difference is greater than a predetermined entrance threshold value, and changes said hydroplaning detection signal from said present state to said absent state when said difference is lower than a predetermined exit threshold value which is smaller than said entrance threshold value.

20. A hydroplaning condition detecting system according to claim 1 wherein said detecting means comprises a means for subtracting said sensed undriven wheel speed from said filtered undriven wheel speed to determine said difference, and a means for comparing said difference with said predetermined value which is greater than zero.

21. A hydroplaning condition detecting system according to claim 1 wherein said condition detecting means comprises a hydroplaning detecting means for changing said hydroplaning detecting signal from an absent state indicative of absence of said hydroplaning condition to a present state indicative of presence of said hydroplaning condition when said difference is greater than a predetermined entrance threshold value, and changes said hydroplaning detection signal from said present state to said absent state when said difference is lower than a predetermined exit threshold value which is smaller than said entrance threshold value.

* * * * *